US008564716B2

(12) United States Patent
Kim

(10) Patent No.: US 8,564,716 B2
(45) Date of Patent: Oct. 22, 2013

(54) CAMERA MODULE

(75) Inventor: Min Soo Kim, Ansan-si (KR)

(73) Assignee: LG Innotek Co., Ltd., Seoul (KR)

(*) Notice: Subject to any disclaimer, the term of this patent is extended or adjusted under 35 U.S.C. 154(b) by 523 days.

(21) Appl. No.: 12/275,294

(22) Filed: Nov. 21, 2008

(65) Prior Publication Data
US 2009/0128681 A1 May 21, 2009

(30) Foreign Application Priority Data

| Nov. 21, 2007 | (KR) | 10-2007-0119373 |
| Nov. 29, 2007 | (KR) | 10-2007-0122755 |
| Dec. 10, 2007 | (KR) | 10-2007-0127457 |
| Dec. 10, 2007 | (KR) | 10-2007-0127693 |
| Dec. 10, 2007 | (KR) | 10-2007-0127694 |

(51) Int. Cl.
*H04N 5/225* (2006.01)
*H01L 31/0203* (2006.01)

(52) U.S. Cl.
USPC .......................................... 348/374; 257/433

(58) Field of Classification Search
USPC .................................................. 348/373–376
See application file for complete search history.

(56) References Cited

U.S. PATENT DOCUMENTS

| 5,952,714 A * | 9/1999 | Sano et al. ............... 257/680 |
| 6,201,701 B1 * | 3/2001 | Linden et al. ............ 361/720 |
| 6,621,606 B2 * | 9/2003 | Takeyama et al. ......... 359/15 |
| 6,795,120 B2 * | 9/2004 | Takagi et al. ............. 348/294 |
| 7,161,630 B2 * | 1/2007 | Akimoto et al. ........ 348/394.1 |
| 7,304,684 B2 * | 12/2007 | Segawa et al. ........... 348/374 |
| 7,515,203 B2 * | 4/2009 | Sato et al. ............... 348/374 |
| 7,595,839 B2 * | 9/2009 | Webster et al. .......... 348/374 |
| 7,646,429 B2 * | 1/2010 | Webster et al. .......... 348/374 |
| 7,825,985 B2 * | 11/2010 | Westerweck et al. ..... 348/374 |
| 2002/0191103 A1 * | 12/2002 | Akimoto et al. ......... 348/374 |

(Continued)

FOREIGN PATENT DOCUMENTS

| CN | 1463141 A | 12/2003 |
| CN | 1482512 A | 3/2004 |

(Continued)

OTHER PUBLICATIONS

Office Action dated Apr. 1, 2013 in Chinese Application No. 201110274787.7, filed Nov. 21, 2008.

*Primary Examiner* — Sinh Tran
*Assistant Examiner* — Christopher K Peterson
(74) *Attorney, Agent, or Firm* — Saliwanchik, Lloyd & Eisenschenk

(57) ABSTRACT

Provided are a camera modules. The camera module includes a lens unit including a lens unit; a holder coupled to the lens unit; an image sensor for converting a light through the lens into an electric signal; and a ceramic board coupled to the holder, the ceramic board having a concave portion where the image sensor is inserted. Another camera module includes a lens unit including a lens barrel; a holder including an infrared ray (IR) cut off filter, the holder being coupled to the lens unit; an image sensor for converting a light through the lens into an electric signal; a ceramic board coupled to the holder, one surface of the ceramic board having a first concave portion; and an image signal processor (ISP) inserted into the first concave portion. Another camera module includes a lens unit including at least one lens; and a ceramic board coupled to the lens unit; the ceramic board including an image sensor and an IR cut off filter; wherein the image sensor is inserted into the ceramic board.

14 Claims, 14 Drawing Sheets

(56) References Cited

U.S. PATENT DOCUMENTS

| | | | |
|---|---|---|---|
| 2004/0027477 A1* | 2/2004 | Tamura et al. | 348/340 |
| 2004/0188816 A1* | 9/2004 | Minami et al. | 257/678 |
| 2004/0192024 A1* | 9/2004 | Ito | 438/623 |
| 2005/0219398 A1* | 10/2005 | Sato et al. | 348/340 |
| 2006/0082658 A1* | 4/2006 | Lee et al. | 348/208.7 |
| 2006/0290801 A1* | 12/2006 | Jao | 348/335 |
| 2008/0303939 A1* | 12/2008 | Hsu et al. | 348/374 |
| 2009/0033789 A1* | 2/2009 | Lin | 348/374 |

FOREIGN PATENT DOCUMENTS

| | | |
|---|---|---|
| CN | 101140347 A | 3/2008 |
| JP | 64-81579 A | 3/1989 |
| TW | 269925 B | 1/2007 |

\* cited by examiner

CAMERA MODULE

CROSS-REFERENCE TO RELATED APPLICATIONS

The present application claims the benefit under 35 U.S.C. §119 of Korean Patent Application Nos. 10-2007-0119373, filed Nov. 21, 2007; 10-2007-0122755, filed Nov. 29, 2007; 10-2007-0127457, filed Dec. 10, 2007; 10-2007-0127693; filed Dec. 10, 2007; and 10-2007-0127694, filed Dec. 10, 2007, which are hereby incorporated by reference in their entirety.

BACKGROUND

As communication technology and digital information processing technology are developed lately, portable terminals integrated with various functions such as information processing and calculation, communication, image information input/output are newly introduced.

Examples of the above portable terminals are personal digital assistants (PDAs) equipped with a digital camera and a communication function, mobile phones with an added digital camera function, and personal multi-media players (PMPs).

Additionally, due to the development of digital camera technology and information storage capability, a high performance digital camera module is extensively mounted on various applicable devices.

BRIEF SUMMARY

The embodiments provide a camera module.

In one embodiment, a camera module includes: a lens unit; a holder coupled to the lens unit; an image sensor for converting a light through the lens into an electric signal; and a ceramic board coupled to the holder, the ceramic board having a concave portion where the image sensor is inserted.

In another embodiment, a camera module includes: a lens unit; a holder including an infrared ray (IR) cut off filter, the holder being coupled to the lens unit; an image sensor for converting a light through the lens into an electric signal; a ceramic board coupled to the holder, one surface of the ceramic board having a first concave portion; and an image signal processor (ISP) inserted into the first concave portion.

In further another embodiment, a camera module includes: a lens unit including at least one lens; and a ceramic board coupled to the lens unit; the ceramic board including an image sensor and an IR cut off filter; wherein the image sensor is inserted into the ceramic board.

The details of one or more embodiments are set forth in the accompanying drawings and the description below. Other features will be apparent from the description and drawings, and from the claims.

DETAILED DESCRIPTION

Hereinafter, a camera module according to embodiments will be described with reference to the accompanying drawings.

Figure 1:
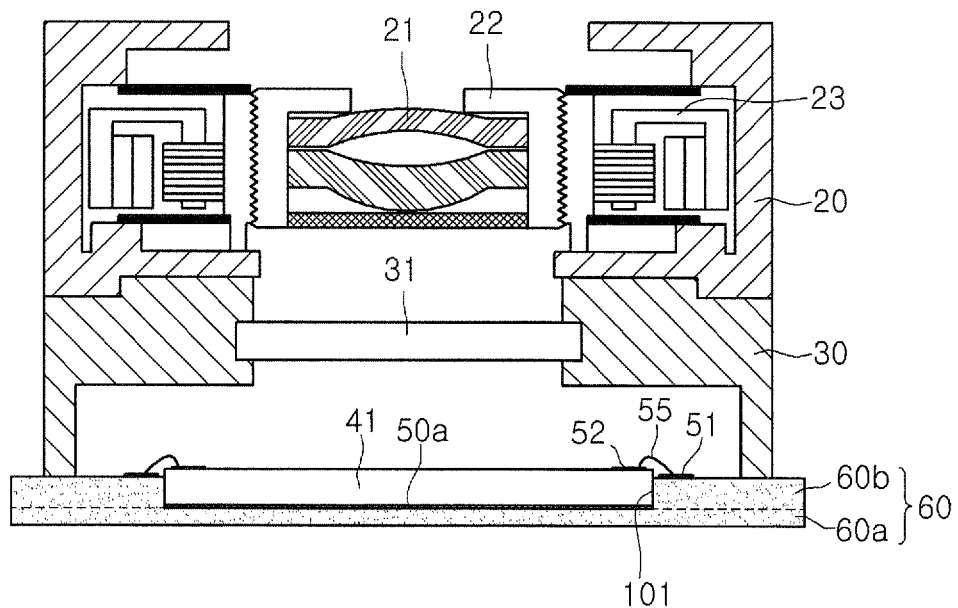
FIGS. 1 to 3 are side-sectional views of camera modules according to first to third embodiments.

FIG. 1 is a side-sectional view of a camera module according to a first embodiment.

As illustrated in FIG. 1, the camera module includes a lens unit 20, a holder 30, and a ceramic board (PCB) 60.

The lens unit 20 includes a lens barrel 22 having a lens and an actuator 23 coupled to the lens barrel 22.

At least one lens 21 is coupled to the lens barrel 22 and the lens 21 collects light toward an image sensor 41.

The actuator 23 coupled to the lens barrel 22 controls a focal point by adjusting the position of the lens 21 and realizes auto focus and optical zoom functions. A piezoelectric device, a stepping motor, and a voice coil motor (VCM) are used as the actuator 23.

The holder 30 is disposed at the bottom of the lens unit 20 and includes an infrared ray (IR) cut off filter 31.

The ceramic board 60 includes the image sensor 41 for converting a light into an electric signal.

The ceramic board 60 includes a first substrate 60a and a second substrate 60b, which are coupled to each other, and is manufactured through a high temperature co-fired ceramic (HTCC) or low temperature co-fired ceramic (LTCC) manufacturing method.

According to the HTCC manufacturing method, a substrate is formed at a temperature of more than about 1300° C. through a co-firing method of a ceramic and a metal. According to the LTCC manufacturing method, a substrate is formed at a temperature of about 800° C. to about 1000° C. through a co-firing method of a ceramic and a metal.

The first substrate 60a is formed with a thickness of about 150 μm to about 200 μm, and the second substrate 60b includes a hole having the same size as the image sensor 41. The hole penetrates an area where the image sensor 41 is to be formed.

Additionally, a first concave portion 101 is formed by coupling the first substrate 60a with the second substrate 60b, and the image sensor 41 is inserted into the first concave portion 101.

In this embodiment, the first substrate 60a and the second substrate 60b are illustrated as one layer. However, the first substrate 60a and the second substrate 60b may be formed by stacking a plurality of substrates and a circuit pattern may be formed on the plurality of substrates.

Since the ceramic board 60 is formed by forming the second substrate 60b (where one substrate or a plurality of substrates having the hole is coupled) on the first substrate 60a or coupling the already-manufactured second substrate 60b having the hole with the first substrate 60a, the image sensor 41 corresponds to the size of the first concave portion 101.

After the image sensor 41 is mounted on the ceramic board 60, the position of the image sensor 41 is fixed.

At this point, since an adhesive material 50a is disposed at the bottom of the first concave portion 101, the ceramic board 60 can be coupled to the image sensor 41.

The adhesive material 50a may be formed of epoxy.

By inserting the image sensor 41 into the first concave portion 101 formed in the ceramic board 60, an overall height of the camera module can be reduced by the distance inserted into the first concave portion 101.

Additionally, since the first concave portion 101 is formed in the ceramic board 60, an additional sensor recognition mark is not required for attaching the image sensor 41.

Since the image sensor 41 is inserted into the first concave portion 101 formed in the ceramic board 60, a tilt and shift change of the image sensor 41 does not occur.

Additionally, a first pad 51 is formed on the ceramic board 60 and a second pad 52 is formed on the image sensor 41. The first pad 51 and the second pad 52 are electrically connected to each other through bonding of a first wire 55.

Figure 2:
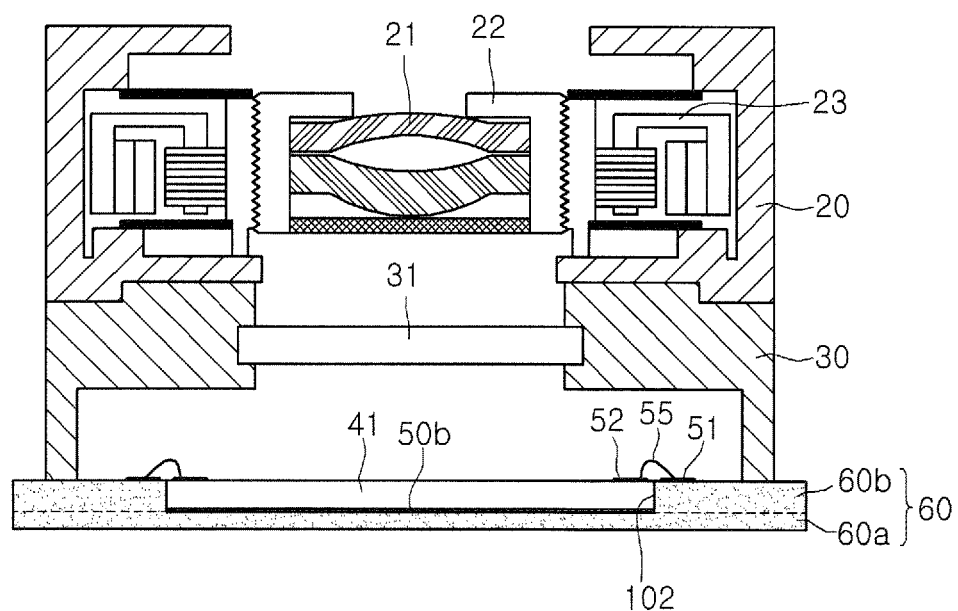

FIG. 2 is a side-sectional view of a camera module according to a second embodiment.

Throughout FIGS. 1 and 2, like reference numbers refer to like elements and their detailed description will be omitted for conciseness.

As illustrated in FIG. 2, the camera module according to the second embodiment includes a lens unit 20, a holder 30, and a ceramic board 60.

The ceramic board 60 includes a first substrate 60a and a second substrate 60b, which are coupled to each other, and is manufactured through the HTCC or LTCC manufacturing method.

The first substrate 60a is formed with a thickness of about 150 µm to about 200 µm, and the second substrate 60b includes a hole having the same size as the image sensor 41. The hole penetrates an area where the image sensor 41 is to be formed.

Additionally, a first concave portion 102 is formed by coupling the first substrate 60a with the second substrate 60b, and then the image sensor 41 is inserted into the first concave portion 102.

At this point, the height of the first concave portion 102 may be the same as that of the image sensor 41.

That is, since there is no height difference between the second substrate 60b and the image sensor 41, the second substrate 60b and the image sensor 41 are disposed on the same parallel plane.

In this embodiment, the first substrate 60a and the second substrate 60b are illustrated as one layer. However, the first substrate 60a and the second substrate 60b may be formed by stacking a plurality of substrates and a circuit pattern may be formed on the plurality of substrates.

Since the ceramic board 60 is formed by forming the second substrate 60b (where one substrate or a plurality of substrates having the hole is coupled) on the first substrate 60a or coupling the already-manufactured second substrate 60b having the hole with the first substrate 60a, the image sensor 41 corresponds to the size of the first concave portion 102.

After the image sensor 41 is mounted on the ceramic board 60, the position of the image sensor 41 is fixed.

At this point, an adhesive material 50b is formed at the bottom of the first concave portion 102, and the ceramic board 60 is coupled to the image sensor 41.

The adhesive material 50b may be formed of epoxy.

Since the image sensor 41 is inserted into the first concave portion 102 formed in the ceramic board 60, an overall height of the camera module can be reduced by the distance inserted into the first concave portion 102.

Additionally, since the first concave portion 102 is formed in the ceramic board 60, an additional sensor recognition mark is not required for attaching the image sensor 41.

Since the image sensor 41 is inserted into the first concave portion 102 formed in the ceramic board 60, a tilt and shift change of the image sensor 41 does not occur.

Additionally, a first pad 51 is formed on the ceramic board 60 and second pad 52 is formed on the image sensor 41. The first pad 51 and the second pad 52 are electrically connected to each other through bonding of a first wire 55.

Figure 3:
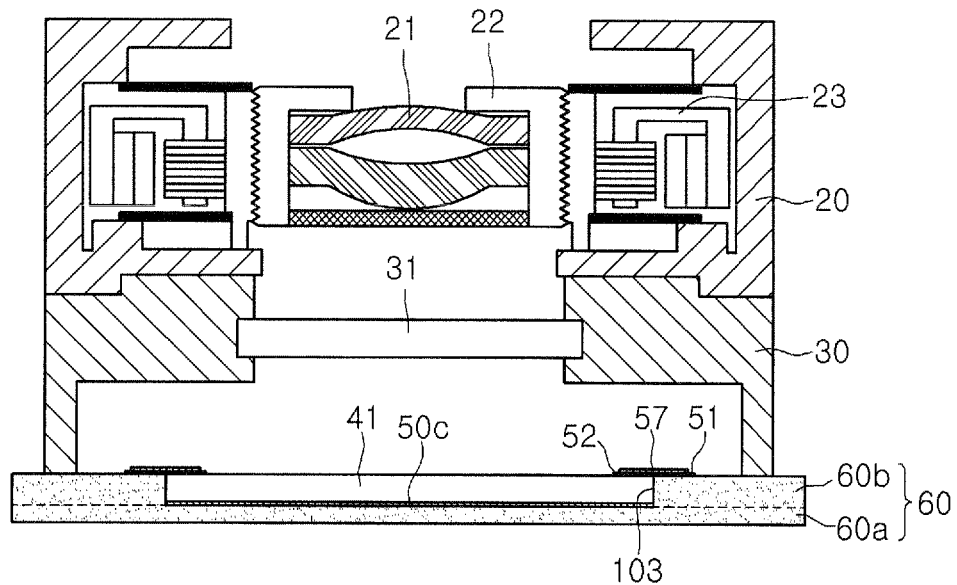

FIG. 3 is a side-sectional view of a camera module according to a third embodiment.

Throughout FIGS. 2 and 3, like reference numbers refer to like elements and their detailed description will be omitted for conciseness.

As illustrated in FIG. 3, the first pad 51 and the second pad 52, formed on the ceramic board 60 and the image sensor 41, may be connected to each other through a first conductive tape 57.

That is, since the height of the first concave portion 103 is the same as the image sensor 41, there is no height difference between the second substrate 60b and the image sensor 41 and the second substrate 60b and the image sensor 41 are disposed on the same parallel plane.

Since there is no height difference between the second substrate 60b and the image sensor 41, the first pad 51 and the second pad 52 are simply connected to each other through the first conductive tape 57.

Additionally, the distance between the first pad 51 and the second pad 52 becomes short.

If the first and second pads 51 and 52 are connected to each other through wire bonding, they need to maintain a predetermined interval therebetween.

However, according to this embodiment, because the first pad 51 and the second pad 52 are connected to each other through the conductive tape instead of the wire bonding, the interval between the first pad 51 and the second pad 52 may be decreased.

That is, the first pad 51 may move toward the image sensor 41, and the second pad 52 may move to the edge of the image sensor 41.

As the interval between the first pad 51 and the second pad 52 is decreased, the size of the ceramic board 60 can be reduced.

According to the camera module according to the above-mentioned first to third embodiments, since the image sensor is inserted into the concave portion formed in the ceramic board substrate, an overall height of the camera module can be decreased by the height of the concave portion.

Additionally, since the concave portion is formed in the ceramic board, an additional sensor recognition mark is not required for attaching the image sensor.

Since the image sensor is inserted into the concave portion formed in the ceramic board 60, a tilt and shift change of the image sensor does not occur.

Additionally, since there is no height difference between the ceramic board and the image sensor, the first pad formed on the ceramic board is connected to the second pad formed on the image sensor through the conductive tape. Since the interval between the first pad and the second pad becomes decreased, the size of the ceramic board can be reduced.

Figure 4:
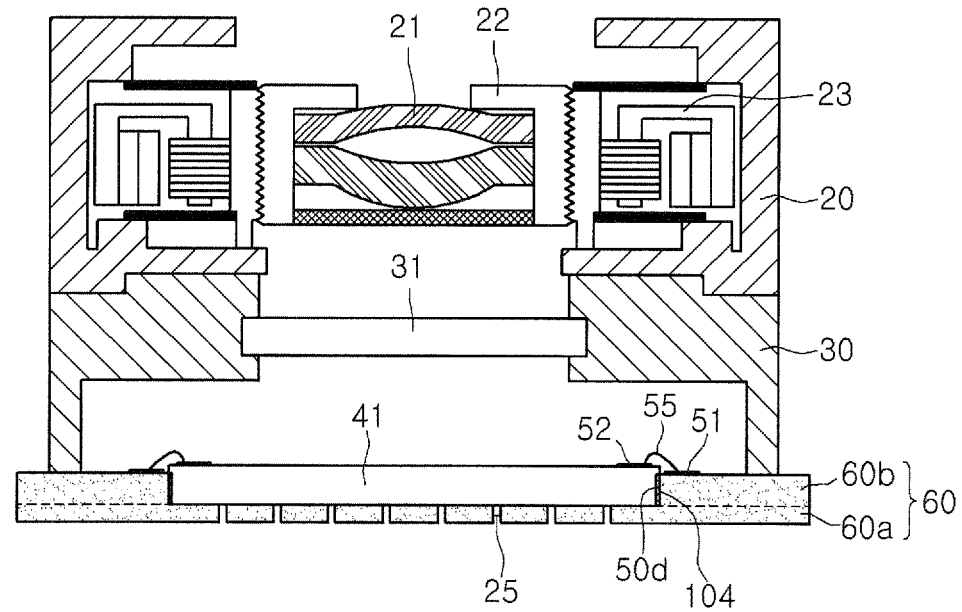
FIG. 4 is a side-sectional view of a camera module according to a fourth embodiment.
Figure 5:
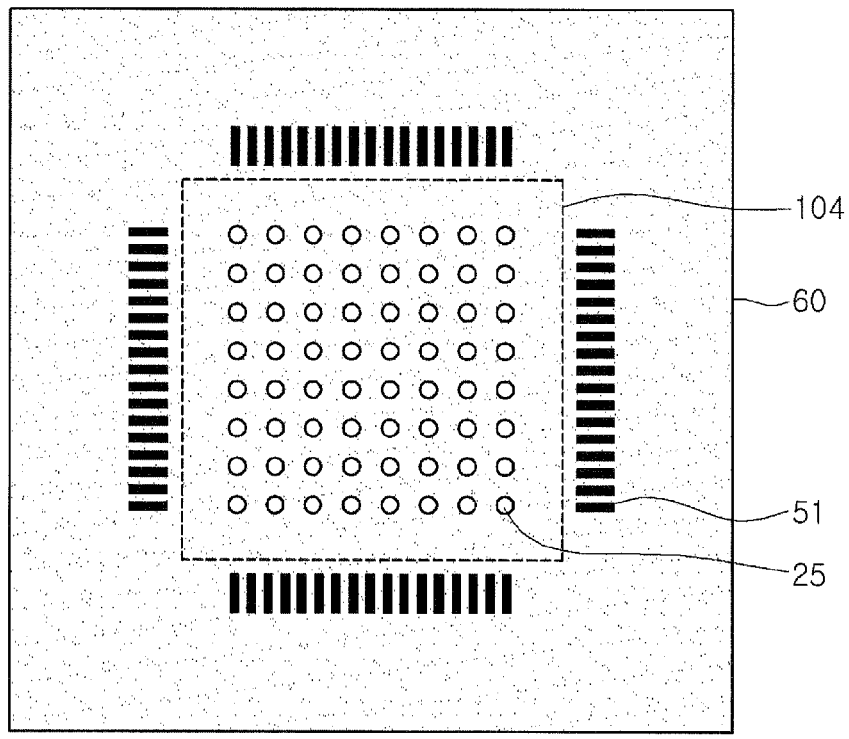
FIG. 5 is a plan view of a ceramic board.

FIG. 4 is a side-sectional view of a camera module according to a fourth embodiment. FIG. 5 is a plan view of a ceramic board.

Throughout FIGS. 1 and 4, like reference numbers refer to like elements and their detailed description will be omitted for conciseness.

As illustrated in FIG. 4, the camera module according to the fourth embodiment includes a lens unit 20, a holder 30, and a ceramic board 60.

The ceramic board 60 includes the image sensor for converting a light into an electric signal. FIG. 5 is a plan view of the ceramic board 60.

The ceramic board 60 includes a first substrate 60a and a second substrate 60b, which are coupled to each other, and is manufactured through the HTCC or LTCC manufacturing method.

The first substrate 60a is formed with a thickness of about 150 μm to about 200 μm, and at least one first hole 25 is formed within an area where the image sensor 41 is disposed.

The first hole 25 penetrates the first substrate 60a below the image sensor 41. Therefore, heat generated from the image sensor 41 can be emitted to the external and deterioration of the device due to the heat can be inhibited.

A second hole is formed in the second substrate 60b. The second hole has the same size as the image sensor 41 and penetrates an area where the image sensor 41 is to be formed.

Additionally, a first concave portion 104 is formed by coupling the first substrate 60a with the second substrate 60b, and the image sensor 41 is inserted into the first concave portion 104.

In this embodiment, the first substrate 60a and the second substrate 60b are illustrated as one layer. However, the first substrate 60a and the second substrate 60b may be formed by stacking a plurality of substrates and a circuit pattern may be formed on the plurality of substrates.

The plurality of substrate constituting the first substrate 60a are stacked after at least one hole is formed therein. Therefore, the first substrate 60a having the first hole 25 is formed.

The ceramic board 60 has the first concave portion 104 by forming the second substrate 60b (where at least one substrate is coupled with the second hole) on the first substrate 60a, or coupling the already-manufactured second substrate 60b having the second hole with the first substrate 60a.

After the image sensor 41 is mounted on the ceramic board 60, the position of the image sensor 41 does not change.

At this point, an adhesive material 50d is disposed on the sidewall of the first concave portion 104, such that the ceramic board 60 is coupled to the image sensor 41.

Since the first hole 25 is disposed below the first concave portion 104, the adhesive material 50d is disposed on the sidewall of the first concave portion 104 in order not to block the first hole 25.

The adhesive material 50d may be formed of epoxy.

Since the image sensor 41 is inserted into the first concave portion 104 formed in the ceramic board 60, an overall height of the camera module can be reduced by the distance inserted into the first concave portion 104.

Additionally, since the first concave portion 104 is formed in the ceramic board 60, an additional sensor recognition mark is not required for attaching the image sensor 41.

Additionally, since at least one first hole 25 is formed within an area where the image sensor 41 of the ceramic board 60 is to be positioned, heat generated from the image sensor 41 can be emitted to the external.

Additionally, since the image sensor 41 is inserted into the first concave portion 104 of the ceramic board 60, a tilt and shift change of the image sensor 41 does not occur.

Moreover, a first pad 51 is formed on the ceramic board 60 and a second pad 52 is formed on the image sensor 41. The first pad 51 and the second pad 52 are electrically connected to each other through bonding of a first wire 55.

Figure 6:
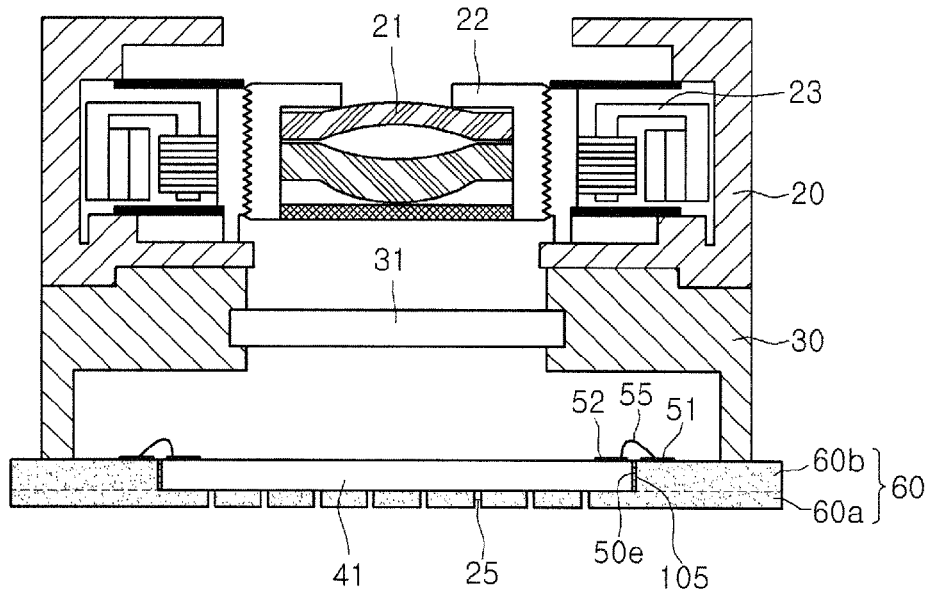
FIGS. 6 to 8 are side-sectional views of camera modules according to fifth to seventh embodiments.

FIG. 6 is a side-sectional view of a camera module according to a fifth embodiment.

Throughout FIGS. 4 and 6, like reference numbers refer to like elements and their detailed description will be omitted for conciseness.

As illustrated in FIG. 6, the camera module according to the fifth embodiment includes a lens unit 20, a holder 30, and a ceramic board 60.

The ceramic PCT 60 includes a stacked layer of a first substrate 60a and a second substrate 60b.

The first substrate 60a is formed with a thickness of about 150 μm to about 200 μm, and at least one first hole 25 is formed within an area where the image sensor 41 is disposed.

The first hole 25 is disposed below the image sensor 41 and penetrates the first substrate 60a. Therefore, heat generated from the image sensor 41 can be emitted to the external and deterioration of the device due to the heat can be inhibited.

A second hole is formed in the second substrate 60b. The second hole has the same size as the image sensor 41 and penetrates an area where the image sensor 41 is to be formed.

Additionally, the first concave portion 105 is formed by coupling the first substrate 60a with the second substrate 60b, and the image sensor 41 is inserted into the first concave portion 104.

At this point, the height of the first concave portion 105 may be the same as the image sensor 41.

That is, there is no height difference between the second substrate 60b and the image sensor 41, and the second substrate 60b and the image sensor 41 are disposed on the same parallel plane.

In this embodiment, the first substrate 60a and the second substrate 60b are illustrated as one layer. However, the first substrate 60a and the second substrate 60b may be formed by stacking a plurality of substrates and a circuit pattern may be formed on the plurality of substrates.

The ceramic board 60 has the first concave portion 105 by forming the second substrate 60b (where at least one substrate is coupled with the second hole) on the first substrate 60a, or coupling the already-manufactured second substrate 60b having the second hole with the first substrate 60a.

After the image sensor 41 is mounted on the ceramic board 60, the position of the image sensor 41 does not change Additionally, an adhesive material 50e is disposed on the sidewall of the first concave portion 105 to couple the ceramic board 60 with the image sensor 41.

Since the first hole 25 is disposed below the first concave portion 105, the adhesive material 50e is formed on the sidewall of the first concave portion 105 in order not to block the first hole 25.

The adhesive material 50e may be formed of epoxy.

Since the image sensor 41 is inserted into the first concave portion 105 formed in the ceramic board 60, an overall height of the camera module can be reduced by the distance inserted into the first concave portion 105.

Additionally, since the first concave portion 105 is formed in the ceramic board 60, an additional sensor recognition mark is not required for attaching the image sensor 41.

Additionally, by forming at least one first hole 25 within an area where the image sensor 41 of the ceramic board 60 is disposed, heat generated from the image sensor 41 can be emitted to the external.

Since the image sensor 41 is inserted into the first concave portion 105 formed in the ceramic board 60, a tilt and shift change of the image sensor 41 does not occur.

Additionally, a first pad 51 is formed on the ceramic board 60 and a second pad 52 is formed on the image sensor 41. Therefore, the first pad 51 and the second pad 52 may be electrically connected to each other through bonding of a first wire 55.

Figure 7:
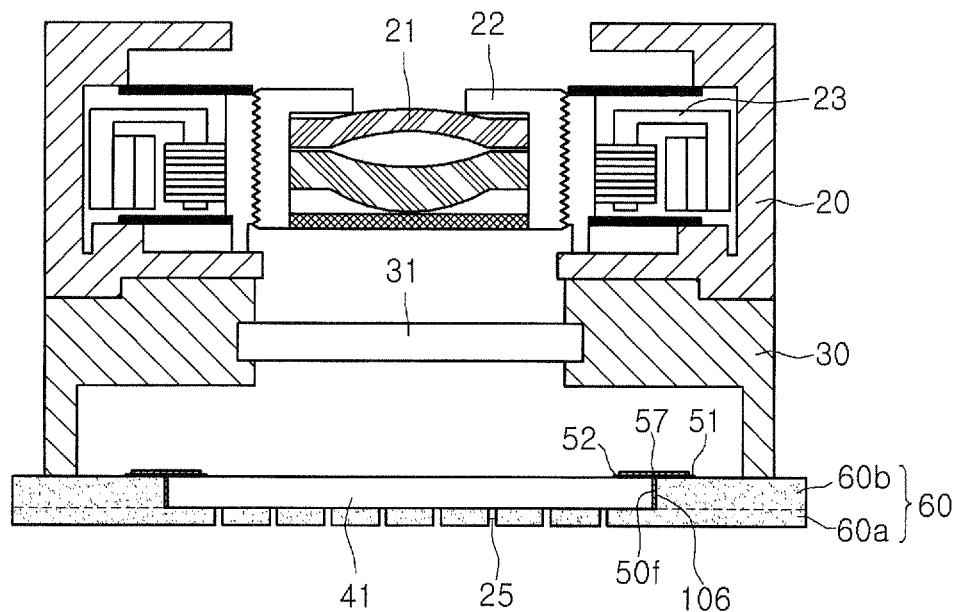

FIG. 7 is a side-sectional view of a camera module according to sixth embodiment.

Throughout FIGS. 6 and 7, like reference numbers refer to like elements and their detailed description will be omitted for conciseness.

As illustrated in FIG. 7, the first pad 51 and the second pad 52 formed on the ceramic board 60 and the image sensor 41 may be electrically connected to each other through a conductive tape 57.

That is, since the height of the first concave portion 106 is the same as the image sensor 41, there is no height difference between the second substrate 60b and the image sensor 41. Therefore, the second substrate 60b and the image sensor 41 are disposed on the same parallel plane.

Since there is no height different between the second substrate 60b and the image sensor 41, the first pad 51 and the second pad 52 can be simply connected to each other through the conductive tape 57.

Additionally, the distance between the first pad 51 and the second pad 52 may be decreased.

If the first and second pads 51 and 52 are connected to each other through wire bonding, they need to maintain a predetermined interval therebetween.

However, in this embodiment, since the first pad 51 is connected to the second pad 52 through the conductive tape 57 instead of the wire bonding, the interval between the first pad 51 and the second pad 52 may be decreased.

That is, the first pad 51 may move toward the image sensor 41, and the second pad 52 may move toward the edge of the image sensor 41.

As the distance between the first pad 51 and the second pad 52 becomes decreased, the size of the ceramic board 60 can be reduced.

In the above mentioned camera modules according to the fourth to sixth embodiments, by inserting the image sensor into the concave portion of the ceramic board, an overall height of the camera module can be decreased by the height of the concave portion.

Additionally, since the first concave portion is formed in the ceramic board, an additional sensor recognition mark is not required for attaching the image sensor.

Since the image sensor is inserted into the first concave portion formed in the ceramic board, a tilt and shift change of the image sensor does not occur.

Additionally, by forming at least one hole within an area where the image sensor of the ceramic board is to be disposed, heat generated from the image sensor can be emitted to the external.

Since there is no height difference between the ceramic board and the image sensor, the first pad on the ceramic board is electrically connected to the second pad on the image sensor through the conductive tape. Additionally, since the interval between the first pad and the second pad become decreased, the size of the ceramic board can be reduced.

Figure 8:
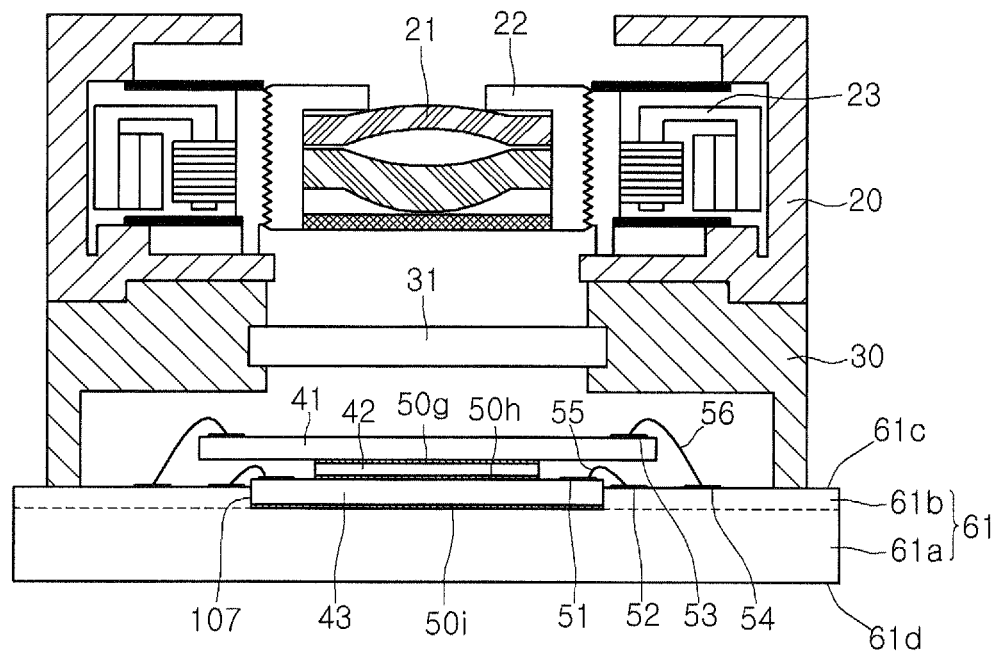

FIG. 8 is a side-sectional view of a camera module according to a seventh embodiment.

As illustrated in FIG. 8, the camera module according to the seventh embodiment includes a lens unit 20, a holder 30, and a ceramic board 61.

Throughout FIGS. 1 and 8, like reference numbers refer to like elements and their detailed description will be omitted for conciseness.

The lens unit 20 includes a lens barrel 22 having a lens and an actuator 23 coupled to the lens barrel 22.

The ceramic board 61 includes the image sensor 41 for converting a light into an electric signal and an image signal processor (ISP) 43 for processing an image signal.

The image sensor 41 is disposed between an infrared ray (IR) cut off filter 31 and the ISP 43.

The ceramic board 61 includes a first substrate 61a and a second substrate 61b, which are coupled to each other, and is manufactured through the HTCC or LTCC manufacturing method.

The second substrate 61b includes a first hole. The first hole has the same or similar size as the ISP 43 and penetrates an area where the ISP 43 is to be formed.

Additionally, a first concave portion 107 is formed by coupling the first substrate 61a with the second substrate 61b, and thus the ISP 43 may be inserted into the first concave portion 107.

When the front surface of the ceramic board 61 coupled to the holder 30 is a first surface 61c and its rear surface is a second surface 61d, the first concave portion 107 is formed on the first surface 61c.

In this embodiment, the first substrate 61a and the second substrate 61b are illustrated as one layer. However, the first substrate 61a and the second substrate 61b may be formed by stacking a plurality of substrates and a circuit pattern may be formed on the plurality of substrates.

In the ceramic board 61, the second substrate 61b (where one substrate or a plurality of substrates having the first hole is formed) is formed on the first substrate 61a or the already-manufacturing second substrate 61b having the first hole is coupled to the first substrate 61a. Thus, the ISP 43 has the size corresponding to that of the first concave portion 107.

After the ISP 43 is mounted on the ceramic board 61, the position of the ISP 43 does not change.

A spacer 42 and an image sensor 41 are formed on the ISP 43.

The spacer 42 adjusts the interval between the ISP 43 and the image sensor 41.

A first pad 51 is formed on the ISP 43 and a second pad 52 is formed on the ceramic board 61. The first pad 51 and the second pad 52 may be connected to each other through bonding of a first wire 55.

Additionally, a third pad 53 is formed on the image sensor 41 and a fourth pad 54 is formed on the ceramic board 61. The third pad 53 and the fourth pad 54 are connected to each other through bonding of a second wire 56.

At this point, the thickness of the spacer 42 may vary according to the height of the first wire 55 for electrically connecting the first pad 51 with the second pad 52, and may range from about 200 μm to about 250 μm.

Additionally, a first adhesive material 50g is formed between the image sensor 41 and the spacer 42, and a second adhesive material 50h is formed between the ISP 43 and the spacer 42. Therefore, the ISP 43 is bonded to the image sensor 41.

Moreover, a third adhesive material 50i is formed on the bottom of the first concave portion 107, such that the ISP 43 can be attached to the ceramic board 61.

The first to third adhesive materials 50g, 50h, and 50i may be formed of epoxy or a double-sided tape.

Figure 9:
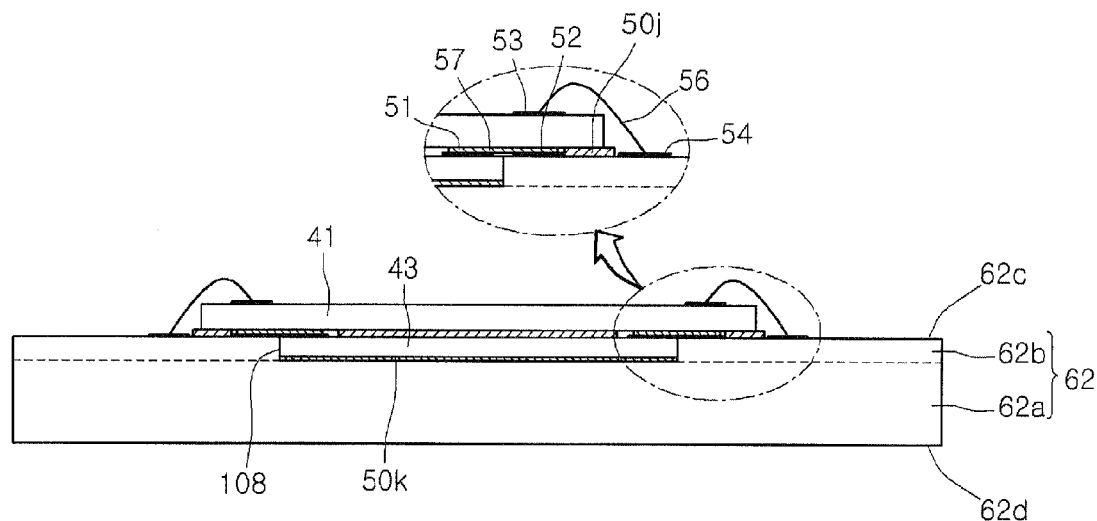
FIGS. 9 to 18 are side-sectional views of camera modules according to eighth to seventeenth embodiments.

FIG. 9 is a side-sectional view of a ceramic board of a camera module according to an eighth embodiment. The drawings for the lens unit 20 and the holder 30 of the camera module are omitted.

Throughout FIGS. 8 and 9, like reference numbers refer to like elements and their detailed description will be omitted for conciseness.

The ceramic board 62 includes a first substrate 62a and a second substrate 62b, which are coupled to each other, and is manufactured through the HTCC or LTCC manufacturing method.

The second substrate 62b includes a first hole. The first hole has the same or similar size as the ISP 43 and penetrates an area where the ISP 43 is to be formed.

Additionally, the first concave portion 108 is formed by coupling the first substrate 62a with the second substrate 62b, and thus the ISP 43 can be inserted into the first concave portion 108.

At this point, the height of the first concave portion 108 is the same as the ISP 43.

That is, since there is no height difference between the second substrate 62b and the ISP 43, the second substrate 62b and the ISP 43 are disposed on the same parallel plane.

When the front surface of the ceramic board 62 coupled to the holder 30 is a first surface 62c and its rear surface is a second surface 62d, the first concave portion 108 is formed on the first surface 62c.

In this embodiment, the first substrate 62a and the second substrate 62b are illustrated as one layer. However, the first substrate 62a and the second substrate 62b may be formed by stacking a plurality of substrates and a circuit pattern may be formed on the plurality of substrates.

In the ceramic board 62, the second substrate 62b (where one substrate or a plurality of substrates having the second hole is formed) is formed on the first substrate 62a or the already-manufacturing second substrate 62b having the first hole is coupled to the first substrate 62a. Thus, the ISP 43 has the size corresponding to that of the first concave portion 108.

After the ISP 43 is mounted on the ceramic board 62, the position of the ISP 43 does not change.

An image sensor 41 is formed on the ISP 43.

Additionally, the first pad 51 and the second pad 52 may be electrically connected to each other through a first conductive tape 57, and the third pad 53 and the fourth pad 54 may be electrically connected to each other through bonding of a second wire 56.

Moreover, a first adhesive material 50j is formed between the image sensor 41 and the ISP 43, such that the ISP 43, the image sensor 41, and the ceramic board 62 are bonded to each other.

At this point, although the adhesive material is formed between the ISP 43 and the image sensor 41 in the above-mentioned eighth embodiment, the first adhesive material 50j may be disposed only between the ISP 43 and the ceramic board 62.

That is, by forming the interval between the ISP 43 and the image sensor 41, heat generated from the ISP can be emitted to the external.

Moreover, a second adhesive material 50k is disposed on the bottom of the first concave portion 108 such that the ceramic board 62 is attached to the ISP 43.

The first and second adhesive materials 50j and 50k may be formed of epoxy or a double-sided tape.

Since the ISP 43 is inserted into the first concave portion 108 of the ceramic board 62, miniaturization of a camera module can be realized by reducing an additional space where the ISP 43 is to be formed.

Figure 10:
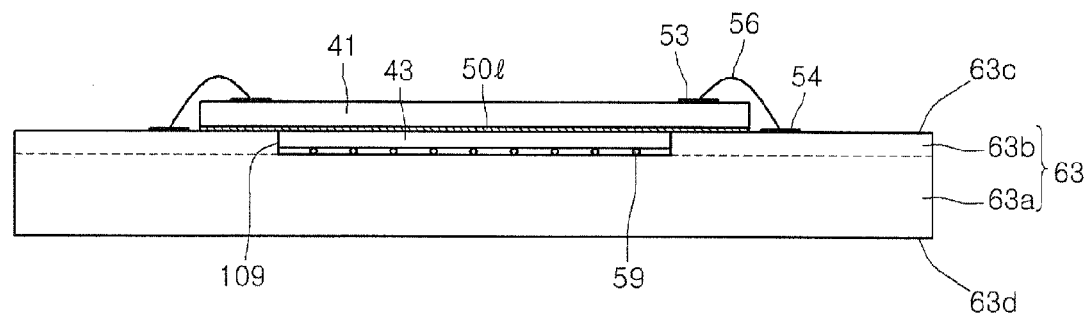

FIG. 10 is a side-sectional view of a ceramic board of a camera module according to a ninth embodiment. The drawings for the lens unit 20 and the holder 30 of the camera module are omitted.

Throughout FIGS. 9 and 10, like reference numbers refer to like elements and their detailed description will be omitted for conciseness.

A ceramic board 63 includes a first substrate 63a and a second substrate 63b, which are coupled to each other, and is manufactured through the HTCC or LTCC manufacturing method.

Additionally, a first concave portion 109 is formed by coupling the first substrate 63a with the second substrate 63b, and thus the ISP 43 can be inserted into the first concave portion 109.

When the front surface of the ceramic board 63 coupled to the holder 30 is a first surface 63c and its rear surface is a second surface 63d, the first concave portion 109 is formed on the first surface 63c.

At this point, the height of the first concave portion 109 is the same as the ISP 43.

That is, there is no height difference between the second substrate 63b and the ISP 43, the first side 63c and the ISP 43 are disposed on the same parallel plane.

In this embodiment, the first substrate 63a and the second substrate 63b are illustrated as one layer. However, the first substrate 63a and the second substrate 63b may be formed by stacking a plurality of substrates and a circuit pattern may be formed on the plurality of substrates.

After the ISP 43 is mounted on the ceramic board 63, the position of the ISP 43 does not change.

Additionally, the ISP 43 is mounted on the ceramic board 63 through a ball grid array (BGA) type such that the ISP 43 is electrically connected to the ceramic board 63 through a ball 59.

The third pad 53 and the fourth pad 54 may be electrically connected to each other through bonding of a second wire 56.

Moreover, a first adhesive material 50l is formed between the image sensor 41 and the ISP 43, such that the ISP 43, the image sensor 41, and the ceramic board 63 are bonded.

At this point, although an adhesive material is formed between the ISP 43 and the image sensor 41 in this embodiment, the first adhesive material 50l may be formed only between the ISP 43 and the ceramic board 63.

The first adhesive material 50l may be formed of epoxy or a double-sided tape.

Since the ISP 43 is inserted into the first concave portion 109 formed in the ceramic board 63, an additional space where the ISP 43 is to be formed can be reduced. Therefore, miniaturization of a camera module can be realized.

Figure 11:
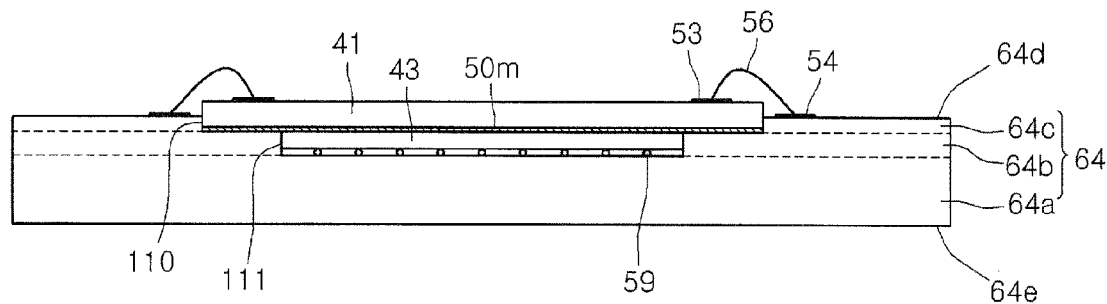

FIG. 11 is a side-sectional view of a ceramic board of a camera module according to a tenth embodiment. The drawings for the lens unit 20 and the holder 30 of the camera module are omitted.

Throughout FIGS. 10 and 11, like reference numbers refer to like elements and their detailed description will be omitted for conciseness.

The ceramic board 64 includes a first substrate 64a, a second substrate 64b and a third substrate 64c, which are coupled to each other, and is manufactured through the HTCC or LTCC manufacturing method.

The first substrate 64a, the second substrate 64b, and the third substrate 64c are coupled to form a second concave portion 110 and a first concave portion 111. The image sensor 41 may be inserted into the second concave portion 110, and the ISP 43 may be inserted into the first concave portion 111.

When the front surface of the ceramic board 64 coupled to the holder 30 is a first surface 64d and its rear surface is a second surface 64e, the second concave portion 110 is formed on the first surface 64d, and the first concave portion 111 is formed below the second concave portion 110.

At this point, the height of the first concave portion 111 is the same as the ISP 43.

That is, the ISP 43 inserted into the second substrate 64b contacts the image sensor 41 on the ISP 43.

In this embodiment, the first, second, and third substrates 64a, 64b, and 64c are illustrated as one layer. However, the first, second, and third substrates 64a, 64b, and 64c may be formed by stacking a plurality of substrates and a circuit pattern may be formed on the plurality of substrates.

After the ISP 43 is mounted on the ceramic board 64, the position of the ISP 43 does not change.

Additionally, the ISP 43 is mounted on the ceramic board 64 through the BGA type such that the ISP 43 is electrically connected to the ceramic board 64 through a ball 59.

The third pad 53 and the fourth pad 54 may be electrically connected to each other through bonding of a second wire 56.

Moreover, a first adhesive material 50*m* is formed between the image sensor 41 and the ISP 43, such that the ISP 43, the image sensor 41, and the ceramic board 64 are bonded to each other.

At this point, although an adhesive material is disposed between the ISP 43 and the image sensor 41 in this embodiment, the first adhesive material 50*m* may be disposed only between the ISP 43 and the ceramic board 64.

The first adhesive material 50*m* may be formed of epoxy or a double-sided tape.

Since the image sensor 41 is inserted into the second concave portion 110 formed in the ceramic board 64, an overall height of the camera module can be reduced by the distance inserted into the second concave portion 110.

Additionally, since the ISP 43 is inserted into the first concave portion 111 formed below the second concave portion 110, an additional space where the ISP 43 is to be formed and the height of the camera module can be reduced. Therefore, miniaturization of the camera module can be realized.

Additionally, since the second concave portion 110 is formed in the ceramic board 64, an additional sensor recognition mark is not required for attaching the image sensor 41.

Since the image sensor 41 is inserted into the second concave portion 110 formed in the ceramic board 64, a tilt and shift change of the image sensor 41 does not occur.

Figure 12:
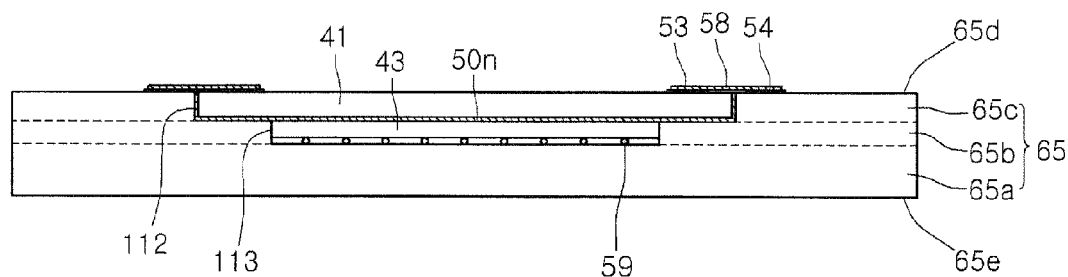

FIG. 12 is a side-sectional view of a ceramic board of a camera module according to an eleventh embodiment. The drawings for the lens unit 20 and the holder 30 of the camera module are omitted.

Throughout FIGS. 11 and 12, like reference numbers refer to like elements and their detailed description will be omitted for conciseness.

The ceramic board 65 includes a first substrate 65*a*, a second substrate 65*b*, and a third substrate 65*c*, which are coupled to each other, and is manufactured through the HTCC or LTCC manufacturing method.

The first substrate 65*a*, the second substrate 65*b*, and the third substrate 65*c* are coupled to form a second concave portion 112 and a first concave portion 113. The image sensor 41 may be inserted into the second concave portion 112, and the ISP 43 may be inserted into the first concave portion 113.

When the front surface of the ceramic board 65 coupled to the holder 30 is a first surface 65*d* and its rear surface is a second surface 65*e*, the second concave portion 112 is formed on the first surface 65*d*, and the first concave portion 113 is formed below the second concave portion 112.

At this point, the height of the first concave portion 113 is the same as the ISP 43, and the height of the second concave portion 112 is the same as the image sensor 41. Therefore, the image sensor 41 and the third substrate 65*e* are disposed on the same parallel plane.

In this embodiment, the first, second, and third substrates 65*a*, 65*b*, and 65*c* are illustrated as one layer. However, the first, second, and third substrates 65*a*, 64*b*, and 65*c* may be formed by stacking a plurality of substrates and a circuit pattern may be formed on the plurality of substrates.

The third pad 53 and the fourth pad 54 are electrically connected to each other through a second conductive tape 58, and the ISP 43 is mounted on the ceramic board 65 through a BGA type, such that the ISP 43 is electrically connected to the ceramic board 65 through a ball 59.

Additionally, a first adhesive material 50*n* is disposed between the image sensor 41 and the ISP 43 such that the ISP 43, the image sensor 41, and the ceramic board 65 are bonded to each other.

In this embodiment, an adhesive material is disposed between the ISP 43 and the image sensor 41, but the first adhesive material 50*n* may be disposed on only an area where the image sensor 41 and the ceramic board 65 contact each other.

The first adhesive material 50*n* may be formed of epoxy or a double-sided tape.

Since the image sensor 41 is inserted into the second concave portion 112 formed in the ceramic board 65, an overall height of the camera module can be reduced by the distance inserted into the second concave portion 112.

Additionally, since there is no height difference between the ceramic board 65 and the image sensor 41, the fourth pad 54 formed on the ceramic board 65 and the third pad 53 formed on the image sensor 41 are connected to each other through a conductive tape. Since the interval between the third pad 53 and the fourth pad 54 can be decreased, the size of the ceramic board 65 can be reduced.

Moreover, since the ISP 43 is inserted into the first concave portion 113 formed below the second concave portion 112, an additional space where the ISP 43 is to be formed and the height of the camera module can be reduced. Therefore, miniaturization of the camera module can be realized.

Additionally, since the second concave portion 112 is formed in the ceramic board 65, an additional sensor recognition mark is not required for attaching the image sensor 41.

Since the image sensor 41 is inserted into the second concave portion 112 formed in the ceramic board 65, a tilt and shift change of the image sensor 41 does not occur.

Figure 13:
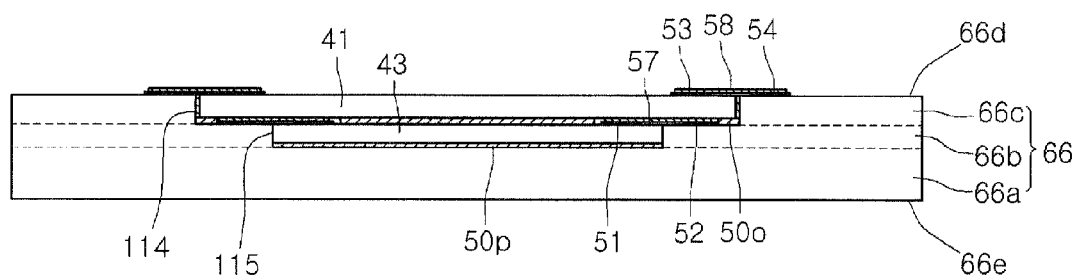

FIG. 13 is a side-sectional view of a ceramic board of a camera module according to a twelfth embodiment. The drawings for the lens unit 20 and the holder 30 of the camera module are omitted.

Throughout FIGS. 12 and 13, like reference numbers refer to like elements and their detailed description will be omitted for conciseness.

The ceramic board 66 includes a first substrate 66*a*, a second substrate 66*b*, and a third substrate 66*c*, which are coupled to each other, and is manufactured through the HTCC or LTCC manufacturing method.

The first substrate 66*a*, the second substrate 66*b*, and the third substrate 66*c* are coupled to form a second concave portion 114 and a first concave portion 115. The image sensor 41 may be inserted into the second concave portion 114, and the ISP 43 may be inserted into the first concave portion 115.

When the front surface of the ceramic board 66 coupled to the holder 30 is a first surface 66*d* and its rear surface is a second surface 66*e*, the second concave portion 114 is formed on the first surface 66*d*, and the first concave portion 115 is formed below the second concave portion 114.

At this point, the height of the first concave portion 115 is the same as the ISP 43, and the height of the second concave portion 114 is the same as the image sensor 41. Therefore, the image sensor 41 and the first surface 66*d* are disposed on the same parallel plane.

In this embodiment, the first, second, and third substrates 66*a*, 66*b*, and 66*c* are illustrated as one layer. However, the first, second, and third substrates 66*a*, 66*b*, and 66*c* may be formed by stacking a plurality of substrates and a circuit pattern may be formed on the plurality of substrates.

The first pad 51 and the second pad 52 are connected to each other through a first conductive tape 57, and the third pad 53 and the fourth pad 54 are connected to each other through a second conductive tape 58.

Additionally, a first adhesive material 50o is disposed between the image sensor 41 and the ISP 43, and a second adhesive material 50p is disposed between the ISP 43 and the ceramic board 66. Therefore, the ISP 43, the image sensor 41, and the ceramic board 66 are bonded to each other.

Although the adhesive material is disposed between the ISP 43 and the image sensor 41 in the twelfth embodiment, the first adhesive material 50o may be formed on only an area where the image sensor 41 and the ceramic board 66 contact each other.

The first and second adhesive materials 50o and 50p may be formed of epoxy or a double-sided tape.

Since the image sensor 41 is inserted into the second concave portion 114 formed in the ceramic board 66, an overall height of the camera module can be reduced by the distance inserted into the second concave portion 114.

Additionally, since there is no height difference between the third substrate 66c and the image sensor 41 and between the second substrate 66b and the ISP 43, the second pad 52 and the fourth pad 54, which are formed in the ceramic board 65, are electrically connected to the first pad 51 and the third pad 53 through the first and second conductive tapes 57 and 58, respectively.

Since the interval between the first pad 51 and the second pad 52 and the interval between the third pad 53 and the fourth pad 54 become decreased, the size of the ceramic board 65 can be reduced.

Moreover, since the ISP 43 is inserted into the first concave portion 115 formed below the second concave portion 114, an additional space where the ISP 43 is to be formed and the height of the camera module can be reduced. Therefore, miniaturization of the camera module can be realized.

Additionally, since the second concave portion 114 is formed in the ceramic board 66, an additional sensor recognition mark is not required for attaching the image sensor 41.

Since the image sensor 41 is inserted into the second concave portion 114 formed in the ceramic board 66, a tilt and shift change of the image sensor 41 does not occur.

Figure 14:
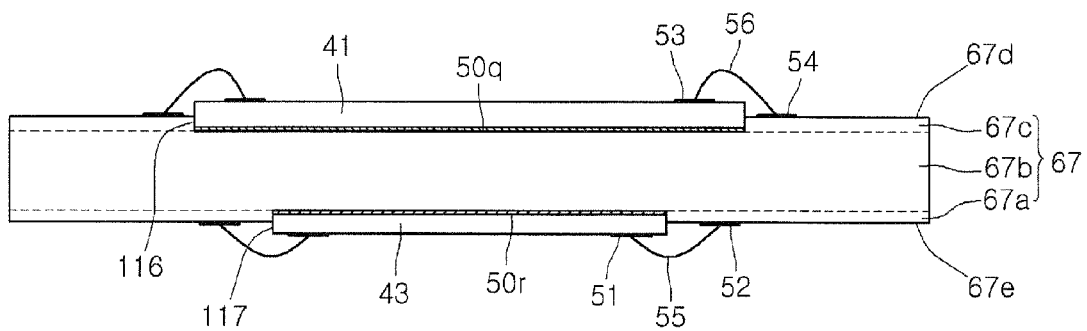

FIG. 14 is a side-sectional view of a ceramic board of a camera module according to a thirteenth embodiment. The drawings for the lens unit 20 and the holder 30 of the camera module are omitted.

Throughout FIGS. 13 and 14, like reference numbers refer to like elements and their detailed description will be omitted for conciseness.

The ceramic board 67 includes a first substrate 67a, a second substrate 67b, and a third substrate 67c, which are coupled to each other, and is manufactured through the HTCC or LTCC manufacturing method.

The first substrate 67a, the second substrate 67b, and the third substrate 67c are coupled to form a second concave portion 116 and a first concave portion 117. The image sensor 41 may be inserted into the second concave portion 116, and the ISP 43 may be inserted into the first concave portion 117.

When the front surface of the ceramic board 67 coupled to the holder 30 is a first surface 67d and its rear surface is a second surface 67e, the second concave portion 116 is formed on the first surface 67d, and the first concave portion 117 is formed on the second surface 67e.

In this embodiment, the first, second, and third substrates 67a, 67b, and 67c are illustrated as one layer. However, the first, second, and third substrates 67a, 67b, and 67c may be formed by stacking a plurality of substrates and a circuit pattern may be formed on the plurality of substrates.

The first pad 51 and the second pad 52 are electrically connected to each other through a first wire 55, and the third pad 53 and the fourth pad 54 are electrically connected to each other through a second wire 56.

A first adhesive material 50q is formed at the bottom of the second concave portion 116 to bond the image sensor 41 with the ceramic board 67, and a second adhesive material 50r is formed at the bottom of the first concave portion 117 to bond the ISP 43 with the ceramic board 67.

The first and second adhesive materials 50q and 50r may be formed of epoxy or a double-sided tape.

An overall height of a camera module can be reduced by the distance that the image sensor 41 and the ISP 43 are inserted into the second concave portion 116 and the first concave portion 117 formed in the ceramic board 67.

Additionally, since the ISP 43 is inserted into the first concave portion 117, an additional space where the ISP 43 is to be formed and the height of the camera module can be reduced. Therefore, miniaturization of the camera module can be realized.

Moreover, since the second concave portion 116 is formed in the ceramic board 67, an additional sensor recognition mark is not required for attaching the image sensor 41.

Since the image sensor 41 is inserted into the second concave portion 116 formed in the ceramic board 67, a tilt and shift change of the image sensor 41 does not occur.

Figure 15:
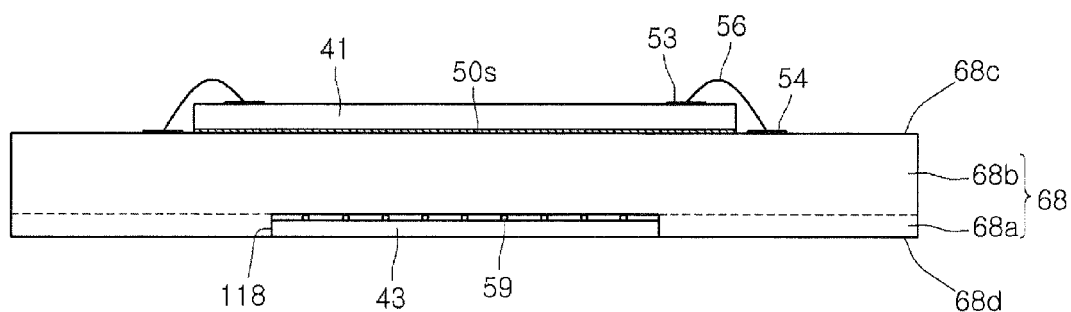

FIG. 15 is a side-sectional view of a ceramic board of a camera module according to a fourteenth embodiment. The drawings for the lens unit 20 and the holder 30 of the camera module are omitted.

Throughout FIGS. 14 and 15, like reference numbers refer to like elements and their detailed description will be omitted for conciseness.

The ceramic board 68 includes a first substrate 68a and a second substrate 68b, which are coupled to each other, and is manufactured through the HTCC or LTCC manufacturing method.

The first substrate 68a and the second substrate 68b are coupled to form a first concave portion 118. The ISP 43 may be inserted into the first concave portion 118.

When the front surface of the ceramic board 68 coupled to the holder 30 is a first surface 68c and its rear surface is a second surface 68d, the first concave portion 118 is formed on the second surface 68d.

In this embodiment, the first substrate 68a and the second substrate 68b are illustrated as one layer. However, the first substrate 68a and the second substrate 68b may be formed by stacking a plurality of substrates and a circuit pattern may be formed on the plurality of substrates.

The third pad 53 and the fourth pad 54 are electrically connected to each other through a second wire 56. Moreover, the ISP 43 is mounted on the ceramic board 68 through a BGA type such that the ISP 43 is electrically connected to the ceramic board 68 through a ball 59.

Moreover, a first adhesive material 50s is formed at the bottom of the image sensor 41 such that the image sensor 41 is bonded to the ceramic board 68.

The first adhesive material 50s may be formed of epoxy or a double-sided tape.

Since the ISP 43 is inserted into the first concave portion 118, an additional space where the ISP 43 is to be formed and the height of the camera module can be reduced. Therefore, miniaturization of the camera module can be realized.

Figure 16:
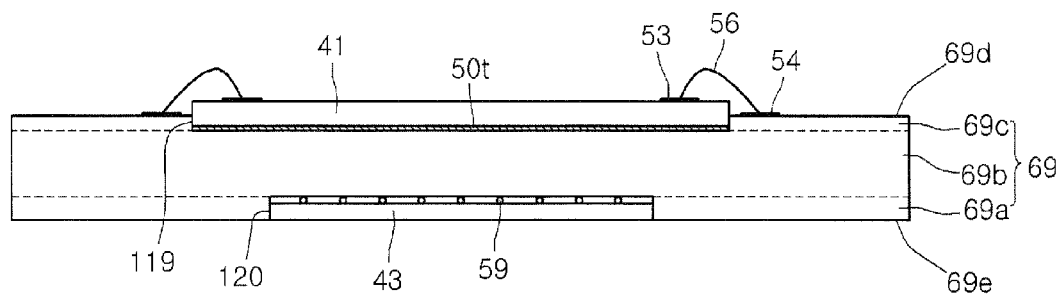

FIG. 16 is a side-sectional view of a ceramic board of a camera module according to a fifteenth embodiment. The drawings for the lens unit 20 and the holder 30 of the camera module are omitted.

Throughout FIGS. 15 and 16, like reference numbers refer to like elements and their detailed description will be omitted for conciseness.

The ceramic board 69 includes a first substrate 69a, a second substrate 69b, and a third substrate 69c, which are coupled to each other, and is manufactured through the HTCC or LTCC manufacturing method.

The first substrate 69a, the second substrate 69b, and the third substrate 69c are coupled to form a second concave portion 119 and a first concave portion 120. The image sensor 41 may be inserted into the second concave portion 119, and the ISP 43 may be inserted into the first concave portion 120.

When the front surface of the ceramic board 69 coupled to the holder 30 is a first surface 69d and its rear surface is a second surface 69e, the second concave portion 119 is formed on the first surface 69d, and the first concave portion 120 is formed on the second surface 69e.

In this embodiment, the first, second, and third substrates 69a, 69b, and 69c are illustrated as one layer. However, the first, second, and third substrates 69a, 69b, and 69c may be formed by stacking a plurality of substrates and a circuit pattern may be formed on the plurality of substrates.

The third pad 53 and the fourth pad 54 are electrically connected to each other through a second wire 56, and the ISP 43 is mounted on the ceramic board 69 through a BGA type such that the ISP 43 is electrically connected to the ceramic board 69 through a ball 59.

Moreover, a first adhesive material 50t is disposed at the bottom of the second concave portion 119 such that the image sensor 41 is bonded to the ceramic board 69.

The first adhesive material 50l may be formed of epoxy or a double-sided tape.

An overall height of the camera module can be reduced by the distance that the image sensor 41 and the ISP 43 are inserted into the second concave portion 119 and the first concave portion 120 formed in the ceramic board 69.

Since the ISP 43 is inserted into the first concave portion 120, an additional space where the ISP 43 is to be formed and the height of the camera module can be reduced. Therefore, miniaturization of a camera module can be realized.

Additionally, since the second concave portion 119 is formed in the ceramic board 69, an additional sensor recognition mark is not required for attaching the image sensor 41.

Since the image sensor 41 is inserted into the second concave portion 119 formed in the ceramic board 69, a tilt and shift change of the image sensor 41 does not occur.

Figure 17:
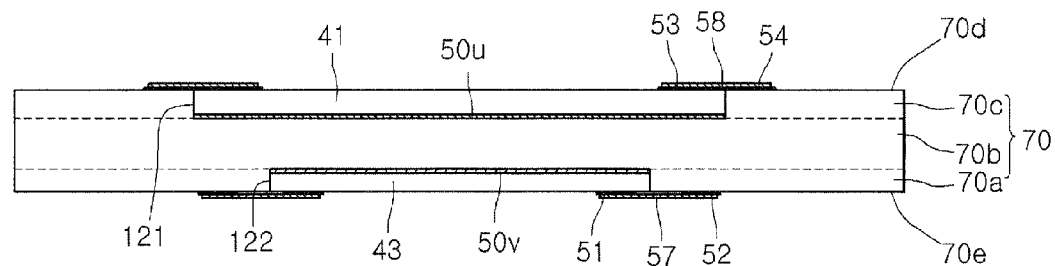

FIG. 17 is a side-sectional view of a ceramic board of a camera module according to a sixteenth embodiment. The drawings for the lens unit 20 and the holder 30 of the camera module are omitted.

Throughout FIGS. 16 and 17, like reference numbers refer to like elements and their detailed description will be omitted for conciseness.

The ceramic board 70 includes a first substrate 70a, a second substrate 70b, and a third substrate 70c, which are coupled to each other, and is manufactured through the HTCC or LTCC manufacturing method.

The first substrate 70a, the second substrate 70b, and the third substrate 70c are coupled to form a second concave portion 121 and a first concave portion 122. The image sensor 41 may be inserted into the second concave portion 121, and the ISP 43 may be inserted into the first concave portion 122.

When the front surface of the ceramic board 70 coupled to the holder 30 is a first surface 70d and its rear surface is a second surface 70e, the second concave portion 121 is formed on the first surface 70d, and the first concave portion 122 is formed on the second surface 70e.

The height of the second concave portion 121 is the same as the image sensor 41, and the height of the first concave portion 122 is the same as the ISP 43. Therefore, the image sensor 41 and the first surface 70d are disposed on the same parallel plane. The ISP 43 and the second surface 70e are disposed on the same parallel plane.

In this embodiment, the first, second, and third substrates 70a, 70b, and 70c are illustrated as one layer. However, the first, second, and third substrates 70a, 70b, and 70c may be formed by stacking a plurality of substrates and a circuit pattern may be formed on the plurality of substrates.

The first pad 51 and the second pad 52 are electrically connected to each other through a first conductive tape 57, and the third pad 53 and the fourth pad 54 are electrically connected to each other through a second conductive tape 58.

A first adhesive material 50u is formed at the bottom of the second concave portion 121, and a second adhesive material 50v is formed at the bottom of the first concave portion 122, such that the ceramic board 70, the image sensor 41, and the ISP 43 are bonded to each other.

The first and second adhesive materials 50u and 50v may be formed of epoxy or a double-sided tape.

Since the image sensor 41 is inserted into the second concave portion 121, an overall height of the camera can be reduced by the distance inserted into the second concave portion 121.

In the ceramic board 70, since there is no height difference between the image sensor 41 and the third substrate 70c and between the ISP 43 and the first substrate 70a, the second pad 52 and fourth pad 54 formed in the ceramic board 70 are electrically connected to the first pad 51 and the second pad 52 through first and second conductive tapes 57 and 58, respectively.

As the interval between the first pad 51 and the second pad 52 and the interval between the third pad 53 and the fourth pad 54 become decreased, the size of the ceramic board 70 can be reduced.

Additionally, since the ISP 43 is inserted into the first concave portion 122, an additional space where the ISP 43 is to be formed and the height of the camera module can be reduced. Therefore, miniaturization of the camera module can be realized.

Moreover, since the second concave portion 121 is formed in the ceramic board 70, an additional sensor recognition mark is not required for attaching the image sensor 41.

Since the image sensor 41 is inserted into the second concave portion 121 formed in the ceramic board 70, a tilt and shift change of the image sensor 41 does not occur.

Figure 18:
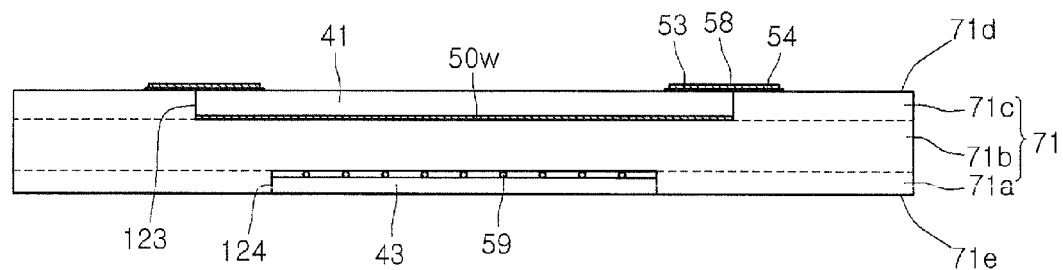

FIG. 18 is a side-sectional view of a ceramic board of a camera module according to a seventeenth embodiment. The drawings for the lens unit 20 and the holder 30 of the camera module are omitted.

Throughout FIGS. 17 and 18, like reference numbers refer to like elements and their detailed description will be omitted for conciseness.

The ceramic board 71 includes a first substrate 71a, a second substrate 71b, and a third substrate 71c, which are coupled to each other, and is manufactured through the HTCC or LTCC manufacturing method.

The first substrate 71a, the second substrate 71b, and the third substrate 71c are coupled to form a second concave portion 123 and a first concave portion 124. The image sensor 41 may be inserted into the second concave portion 123, and the ISP 43 may be inserted into the first concave portion 124.

When the front surface of the ceramic board 71 coupled to the holder 30 is a first surface 71d and its rear surface is a second surface 71e, the second concave portion 123 is formed in the first surface 71d, and the first concave portion 124 is formed in the second surface 71e.

At this point, the height of the second concave portion 123 is the same as the image sensor 41 and the height of the first concave portion 124 is the same as the ISP 43. The image sensor 41 and the first surface 71d are disposed on the same parallel plane. The ISP 43 and the second surface 71e are disposed on the same parallel plane.

In this embodiment, the first, second, and third substrates 71a, 71b, and 71c are illustrated as one layer. However, the first, second, and third substrates 70a, 70b, and 70c may be formed by stacking a plurality of substrates and a circuit pattern may be formed on the plurality of substrates.

The third pad 53 and the fourth pad 54 are electrically connected to each other through a second conductive tape 58, and the ISP 43 is mounted on the ceramic board 71 through a BGA type such that the ISP 43 is electrically connected to the ceramic board 71 through a ball 59.

A first adhesive material 50w is formed at the bottom of the second concave portion 123 such that the ceramic board 71 and the image sensor 41 are bonded.

The first adhesive material 50w may be formed of epoxy or a double-sided tape.

Since the image sensor 41 is inserted into the second concave portion 123, an overall height of the camera can be reduced by the distance inserted into the second concave portion 123.

Additionally, since there is no height difference between the image sensor 41 and the third substrate 71c and between the ISP 43 and the first substrate 70a, the fourth pad 54 formed on the ceramic board 71 is electrically connected to the third pad 53 through a second conductive tape 58.

Additionally, as the interval between the third pad 53 and the fourth pad 54 becomes reduced, the size of the ceramic board 71 can be reduced.

Moreover, since the ISP 43 is inserted into the first concave portion 124, an additional space where the ISP 43 is to be formed and the height of the camera module can be reduced. Therefore, miniaturization of a camera module can be realized.

Additionally, since the second concave portion 123 is formed in the ceramic board 71, an additional sensor recognition mark is not required for attaching the image sensor 41.

Since the image sensor 41 is inserted into the second concave portion 123 formed in the ceramic board 71, a tilt and shift change of the image sensor 41 does not occur.

In the camera modules according to the above-mentioned embodiments, since the image sensor and the ISP are inserted into the concave portions formed in the ceramic board, an entire height of the camera module can be reduced by the height of the concave portion.

Moreover, since the concave portion is formed in the ceramic board, an additional sensor recognition mark is not required for attaching the image sensor.

Furthermore, since the image sensor is inserted into the concave portion formed in the ceramic board, a tilt and shift change of the image sensor does not occur.

In addition, since the ISP is inserted into the concave portion formed in the ceramic board, an additional space where the ISP is to be formed and the height of the camera module can be reduced. Therefore, miniaturization of the camera module can be realized.

Besides, since there is no height difference between the ceramic board and the image sensor, the pads formed on the ceramic board are connected to the pads formed on the image sensor and the ISP through the conductive tape. Also, since the interval between the pads becomes decreased, the size of the ceramic board can be reduced.

FIGS. 19 to 25 are side-sectional views and plan views illustrating a method for manufacturing a camera module according to an eighteenth embodiment.

Figure 19:
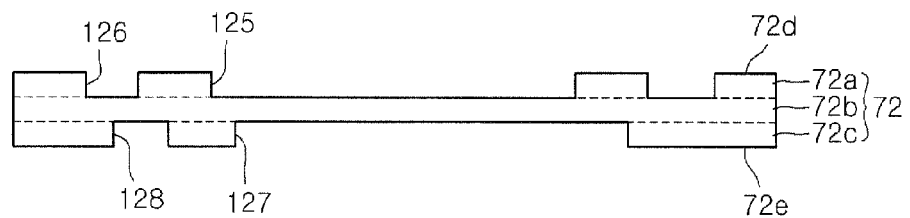
FIGS. 19 to 25 are side-sectional views and plan views of a camera module according to an eighteenth embodiment.

As illustrated in FIG. 19, a ceramic board 72 including a first concave portion 125, a second concave portion 126, a third concave portion 127, and a fourth concave portion 128 is formed.

The ceramic board 72 includes a first substrate 72a, a second substrate 72b, and a third substrate 72c, which are coupled to each other, and is manufactured through the HTCC or LTCC manufacturing method.

The first substrate 72a includes a first hole and a second hole having the same or similar size as an image sensor and a first peripheral device respectively. The first hole and the second hole penetrate an area where the image sensor and the first peripheral device are to be formed.

Additionally, the third substrate 72c includes a third hole and a fourth hole having the same or similar size as an ISP and a second peripheral device respectively. The third hole and the fourth hole penetrate an area where the ISP and the second peripheral device are to be formed.

Then, the first substrate 72a and the second substrate 72b are coupled to form the first concave portion 125 and the second concave portion 126, and the second substrate 72b and the third substrate 72c are coupled to form the third concave portion 127 and the fourth concave portion 128. Therefore, the ceramic board 72 can be formed.

Next, when the front surface of the ceramic board 72 coupled to the holder is a first surface 72d and its rear surface is a second surface 72e, the first concave portion 125 and the second concave portion 126 are formed in the first surface 72d, and the third concave portion 127 and the fourth concave portion 128 are formed in the second surface 72e.

In this embodiment, the first, second, and third substrates 72a, 72b, and 72c are illustrated as one layer. However, the first, second, and third substrates 72a, 72b, and 72c may be formed by stacking a plurality of substrates and a circuit pattern may be formed on the plurality of substrates.

Figure 20:
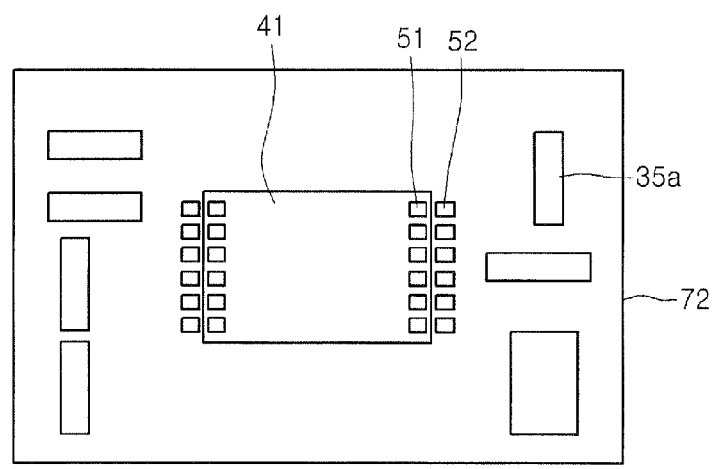
Figure 21:
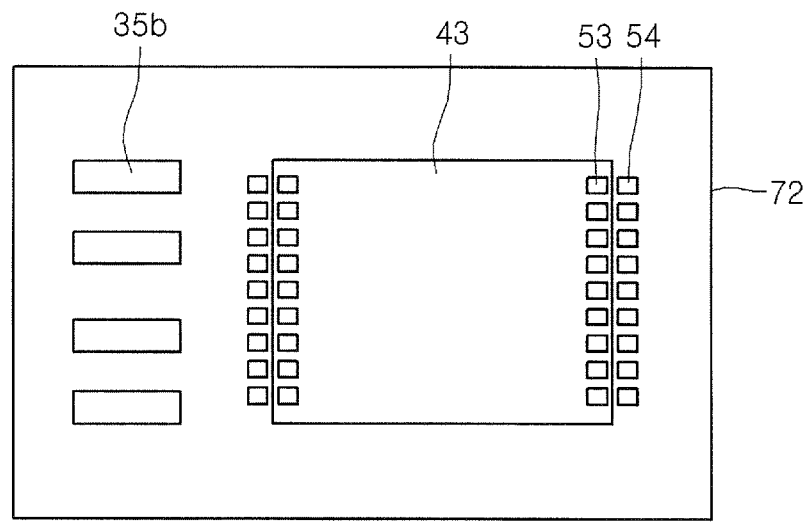

As illustrated in FIGS. 20 and 21, an image sensor 41, a first peripheral device 35a, an ISP 43, and a second peripheral device 35b are installed in the ceramic board 72.

FIG. 20 is a plan view illustrating the first surface 72d of the ceramic board 72. As illustrated in FIG. 20, the image sensor 41 is disposed in the first concave portion 125 and the first peripheral device 35a is disposed in the second concave portion 126.

The image sensor 41 includes a first pad 51 and the ceramic board 72 includes a second pad 52.

The first peripheral device 35a may include an active element, a passive element, and a driver.

FIG. 21 is a plan view illustrating the second surface 72e of the ceramic board 72. As illustrated in FIG. 21, the ISP 43 is disposed in the third concave portion 127, and the second peripheral device 35b is disposed in the fourth concave portion 128.

The ISP 43 includes a third pad 53 and the ceramic board 72 includes a fourth pad 54.

The second peripheral device 35b may include an active device and a passive device.

Figure 22:
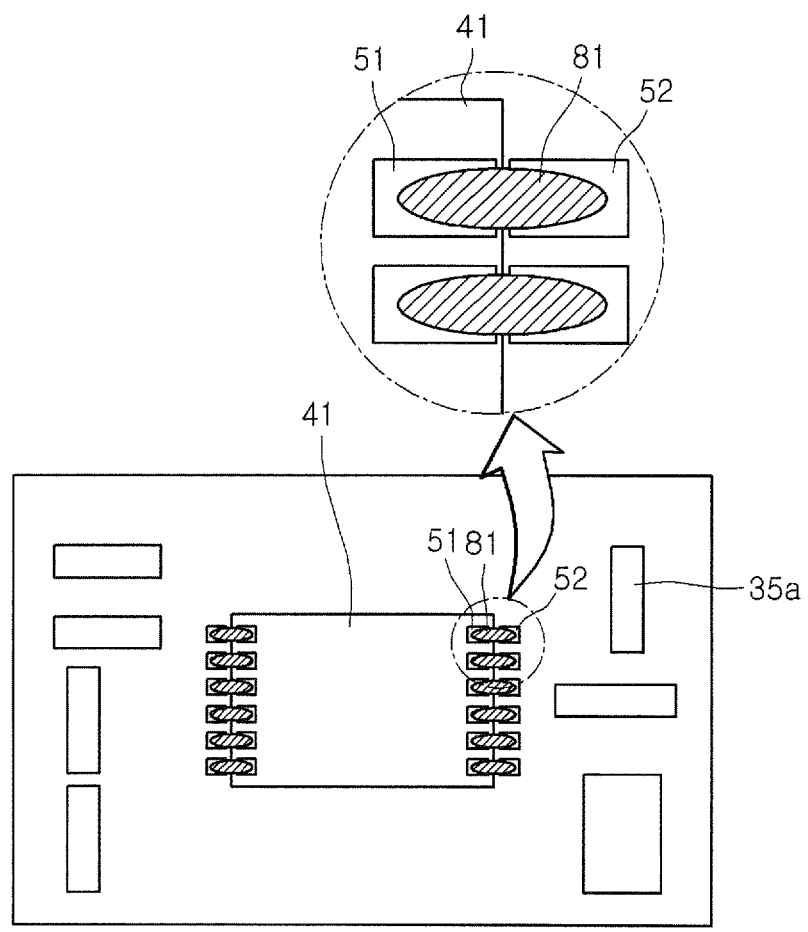
Figure 23:
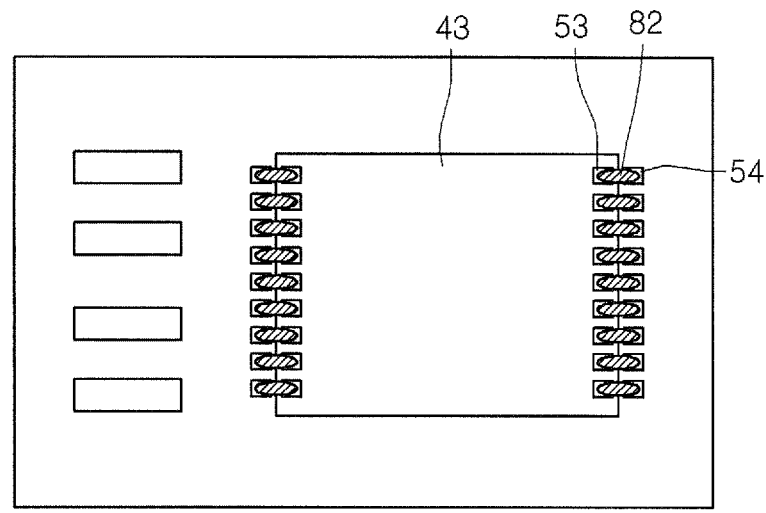

As illustrated in FIGS. 22 and 23, the first pad 51 and the second pad 52 are connected to each other through a first solder 81 and the third pad 53 and the fourth pad 54 are connected to each other through a second solder 82.

The first solder 81 and the second solder 82 may be formed of materials such as Au, Al, Pb, and Cu through a soldering process.

Since the above materials are used for forming the first solder 81 and the second solder 82 through the soldering process, repair may be possible if there is a defective device.

The first pad 51 and the third pad 53 may be electrically connected to the second pad 52 and the fourth pad 54 formed in the ceramic board 72, respectively, through the first solder 81 and the second solder 82.

Figure 24:
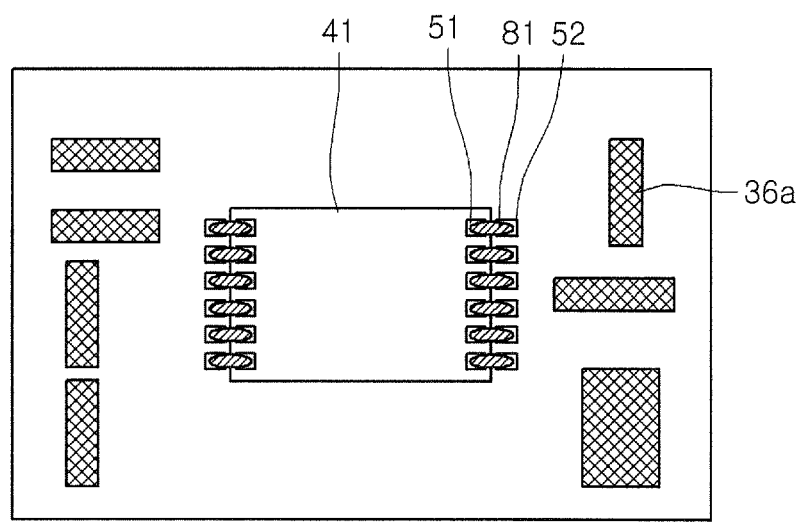
Figure 25:
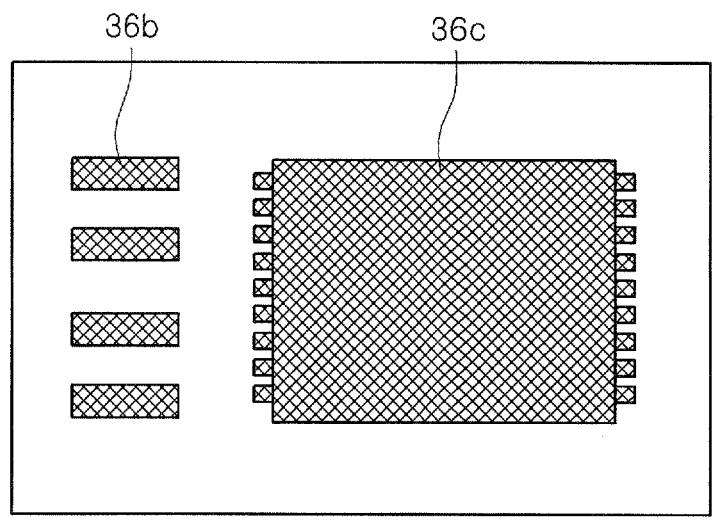

Next, as illustrated in FIGS. 24 and 25, a first molding material 36a, a second molding material 36b, and a third molding material 36c are formed to cover the first peripheral device 35a, the second peripheral device 35b, and the ISP 43.

The first molding material 36a, the second molding material 36b, and the third molding material 36c protects the first peripheral device 35a, the second peripheral device 35b, and the ISP 43 from the external photoelectrons, in order to inhibited noise occurrence.

Moreover, technology security can be enhanced to prevent technical know-how for a product from leaking.

At this point, the first molding material 36a, the second molding material 36b, and the third molding material 36c may be formed of an opaque insulating material.

Figure 26:
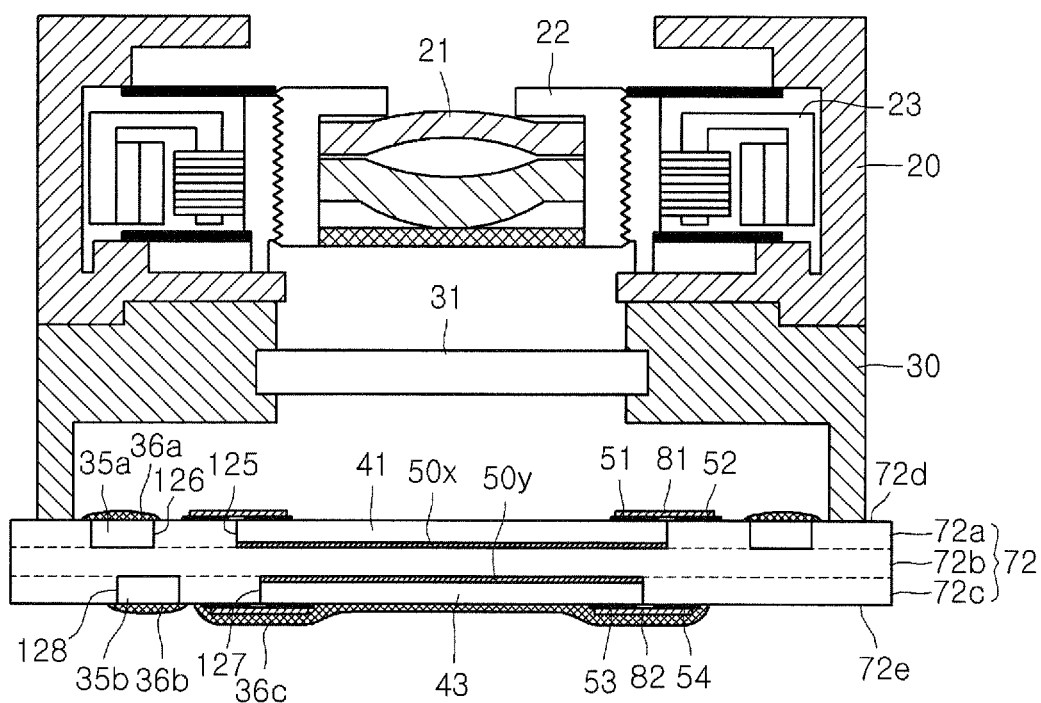
FIG. 26 is a side-sectional view of a camera module according to an eighteenth embodiment.

As illustrated in FIG. 26, the ceramic board 72 is coupled to a lens unit 20 and a holder 30.

At this point, the holder 30 may be coupled to the first surface 72d of the ceramic board 72.

FIG. 26 is a side-sectional view of a camera module according to an eighteenth embodiment.

As illustrated in FIG. 26, the camera module according to an embodiment includes a lens unit 20, a holder 30, and a ceramic board 72.

Throughout FIGS. 1 and 26, like reference numbers refer to like elements and their detailed description will be omitted for conciseness.

The ceramic board 72 includes an image sensor 41 for converting a light to an electric signal, an ISP 43 for processing an image signal, a first peripheral device 35a, and a second peripheral device 35b. Also, the ceramic board 72 includes a first molding material 36a, a second molding material 36b, and a third molding material 36c to cover the ISP 43, the first peripheral device 35a, and the second peripheral device 35b.

The image sensor 41 is disposed between the IR cut off filter 31 and the ISP 43.

The ceramic board 72 is formed by coupling the first substrate 72a, the second substrate 72b, and the third substrate 72c and is manufactured through the HTCC or LTCC method.

When the front surface of the ceramic board 72 coupled to the holder 30 is a first surface 72d and its rear surface is a second surface 72e, the first surface 72d of the ceramic board 72 includes a first concave portion 125 and a second concave portion 126, and the second surface 72e includes a third concave portion 127 and a fourth concave portion 128.

The image sensor 41 is inserted into the first concave portion 125 and the ISP 43 is inserted into the third concave portion 127. The first peripheral device 35a and the second peripheral device 35b are inserted into the second concave portion 126 and the fourth concave portion 128 respectively.

At this point, a first adhesive material 50x is formed at the bottom of the first concave portion 125, and a second adhesive material 50y is formed at the bottom of the third concave portion 127.

The first and second adhesive materials 50x and 50y may be formed of epoxy.

The image sensor 41 inserted into the first concave portion 125 and the first surface 72d are disposed on the same parallel plane, and the ISP 43 inserted into the third concave portion 127 and the second surface 72e are disposed on the same parallel plane.

The first peripheral device 35a and the second peripheral device 35b may include an active element, a passive element, and a driver.

In this embodiment, the first, second, and third substrates 72a, 72b, and 72c are illustrated as one layer. However, the first, second, and third substrates 72a, 72b, and 72c may be formed by stacking a plurality of substrates and a circuit pattern may be formed on the plurality of substrates.

A first pad 51 is formed on the image sensor 41 and a second pad 52 is formed on the ceramic board 72, such that the first pad 51 and the second pad 52 are electrically connected to each other through a first solder 81.

Additionally, a third pad 53 is formed on the ISP 43 and a fourth pad 54 is formed on the ceramic board 72, such that the third pad 53 and the fourth pad 54 are electrically connected to each other through a second solder 82.

The first solder 81 and the second solder 82 may be formed of materials such as Au, Al, Pb, and Cu through a soldering process.

The first molding material 36a is formed on the first peripheral device 35a. The second molding material 36b is formed on the second peripheral device 35b. The third molding material 36c is formed on the ISP 43.

The first molding material 36a, the second molding material 36b, and the third molding material 36c protects the first peripheral device 35a, the second peripheral device 35b, and the ISP 43 from the external photoelectrons, in order to inhibit noise occurrence.

Moreover, technology security can be enhanced to prevent technical know-how for a product from leaking by using the first molding material 36a, the second molding material 36b, and the third molding material 36c.

At this point, the first molding material 36a, the second molding material 36b, and the third molding material 36c may be formed of an opaque insulating material.

In the camera module according to the eighteenth embodiment, since the image sensor, the ISP, and the peripheral device are inserted into the ceramic board, an additional space where the ISP is to be formed and the height of the camera module can be reduced. Miniaturization of the camera module can be realized.

Additionally, since the image sensor is inserted into the concave portion in the ceramic board, an additional sensor recognition mark is not required for attaching the image sensor. Moreover, a tilt and shift charge of the image sensor does not occur.

Moreover, a soldering process is performed on the image sensor, the pads formed in the ISP, and the pads of the ceramic board in order to electrically connect them. Therefore, repair may be possible if there is a defective device.

Additionally, by forming a molding material on the peripheral device and the ISP to protect them from the external photoelectrons, noise occurrence can be inhibited.

Furthermore, technology security can be enhanced to prevent technical know-how for a product from leaking.

Figure 27:
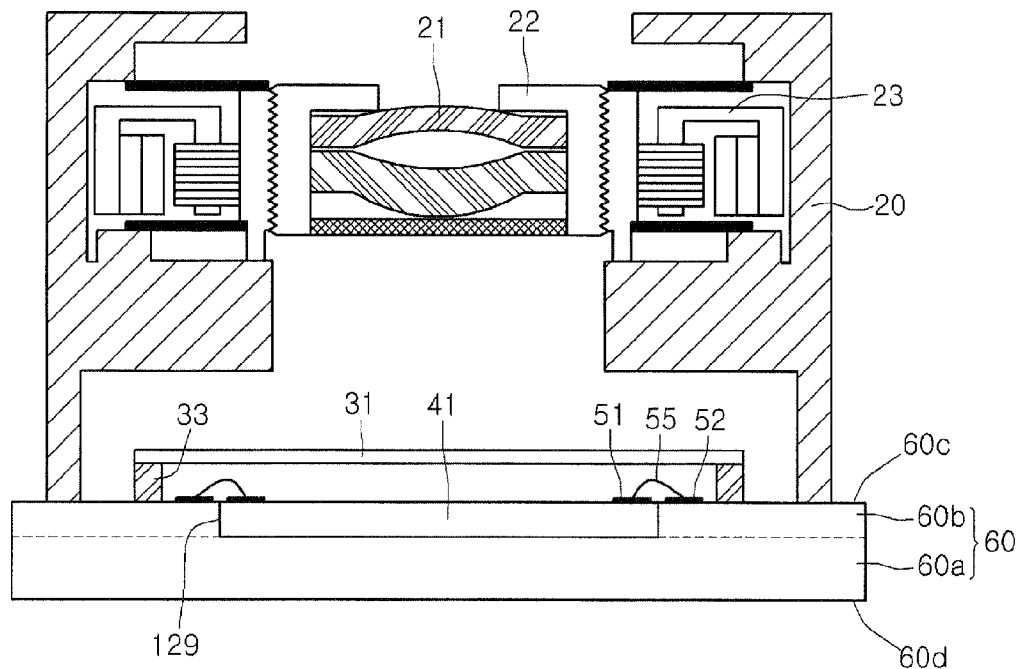
FIGS. 27 to 31 are side-sectional views of camera modules according to nineteenth to twenty-first embodiments.

FIG. 27 is a side-sectional view of a camera module according to a nineteenth embodiment.

As illustrated in FIG. 27, the camera module according to this embodiment includes a lens unit 20 and a ceramic board 60.

The lens unit 20 includes a lens barrel 22 having a lens 21 and an actuator 23 connected to the lens barrel 22.

The ceramic board 60 includes the image sensor 41 for converting a light into an electric signal and the IR cut off filter 31.

Since the IR cut off filter 31 is formed on the ceramic board 60, an additional holder is not required for installing the IR cut off filter 31.

Accordingly, a design space of a camera module structure can be obtained. Due to the design space, durability, performance, and reliability of the camera module can be improved.

The ceramic board 60 is formed by coupling the first substrate 60a and the second substrate 60b and is manufactured through the HTCC or LTCC method.

The second substrate 60b includes a hole having the same size as the image sensor 41. The hole penetrates an area where the image sensor 41 is to be formed.

Additionally, the first substrate 60a and the second substrate 60b are coupled to form a first concave portion 129, and the image sensor 41 is inserted into the first concave portion 129.

When the front surface of the ceramic board 60 coupled to the lens unit 20 is a first surface 60c and its rear surface is a second surface 60d, the first concave portion 129 is formed on the first surface 60c.

In this embodiment, the first substrate 60a and the second substrate 60b are illustrated as one layer. However, the first substrate 60a and the second substrate 60b may be formed by stacking a plurality of substrates and a circuit pattern may be formed on the plurality of substrates.

The ceramic board 60 includes the first concave portion 129 by forming the second substrate 60b (where one substrate or a plurality of substrates having the hole is coupled) on the first substrate 60a or coupling the already-manufactured second substrate 60b having the hole with the first substrate 60a.

After the image sensor 41 is mounted on the ceramic board 60, the position of the image sensor 41 does not change.

The IR cut off filter 31 is formed on the ceramic board 60 including the image sensor 41. A spacer 33 is disposed between the ceramic board 60 and the IR cut off filter 31.

The spacer 33 adjusts the interval between the ceramic board 60 and the IR cut off filter 31.

As mentioned above, since the IR cut off filter 31 is formed on the image sensor 41, the image sensor 41 is not polluted.

There is no cleansing method when impurity exists in a lens during manufacturing of the lens. However, since the IR cut off filter 31 is disposed on the ceramic board 60, the impurity can be removed by cleaning the lens after lens assembly. Then, the lens unit 20 can be coupled to the ceramic board 60. Consequently, a proportion of defective camera modules can be minimized.

Additionally, if the filter is polluted, the holder and the actuator must be destroyed together. However, since the IR cut off filter 31 is disposed on the ceramic board 60, if the IR cut off filter 31 is polluted, only the IR cut off filter 31 can be replaced. Therefore, its repair becomes simple.

Additionally, the first pad 51 is formed on the image sensor 41 and the second pad 52 is formed on the ceramic board 60. The first pad 51 and the second pad 52 are electrically connected to each other through bonding of a first wire 55.

At this point, the thickness of the spacer 33 varies according to the height of the first wire 55 for electrically connecting the first pad 51 with the second pad 52, and may be thicker than the height of the first wire 55.

Although not illustrated in the drawings, an adhesive material is formed on the spacer 33 such that the IR cut off filter 31 and the ceramic board 60 can be bonded.

Additionally, although not illustrated in the drawings, an adhesive material is formed at the bottom of the first concave portion 129 such that image sensor 41 and the ceramic board 60 can be bonded.

The adhesive material may be formed of epoxy or a double-sided tape.

Figure 28:
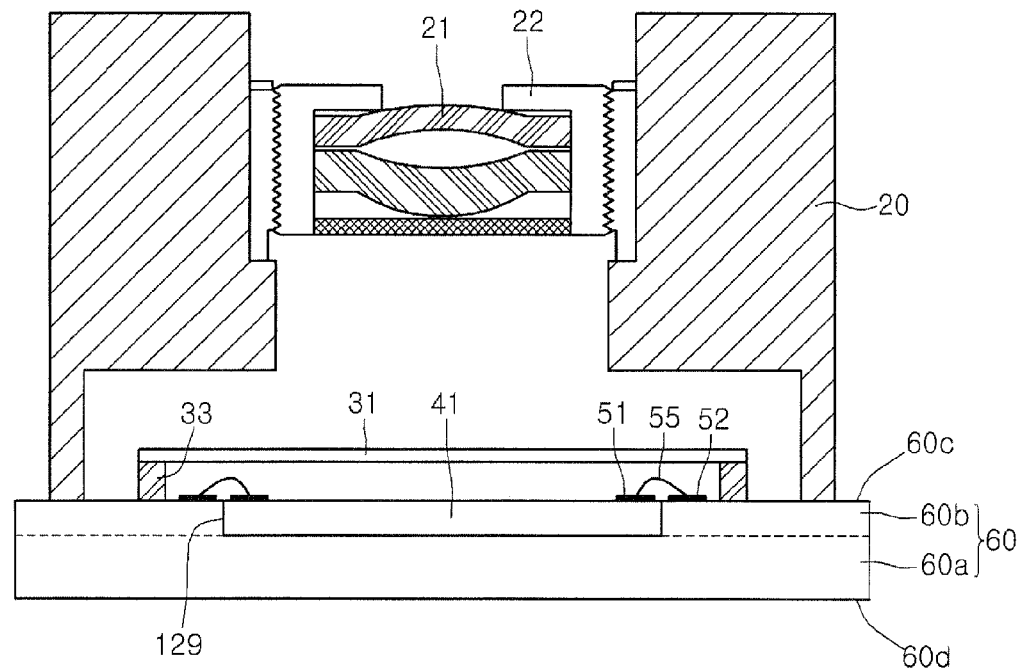

This embodiment illustrates a camera module having auto focus function where the actuator 23 is disposed but is not limited thereto. That is, as illustrated in FIG. 28, a camera module having a fixed focus function where no actuator 23 is disposed may be possible.

Figure 29:
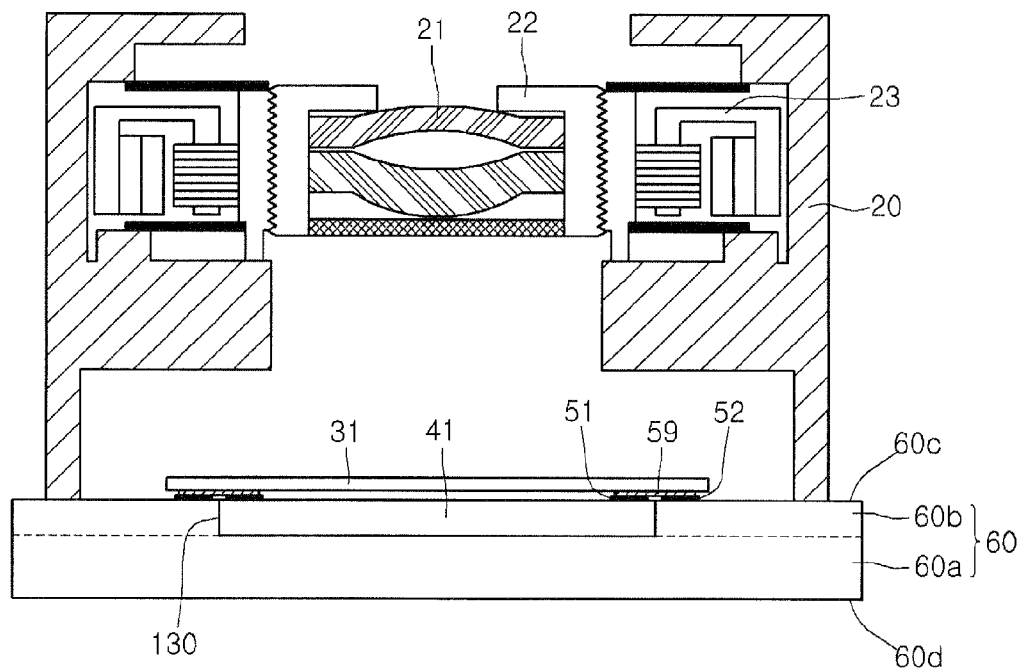

FIG. 29 is a side-sectional view of a camera module according to a twentieth embodiment.

Throughout FIGS. 27 and 29, like reference numbers refer to like elements and their detailed description will be omitted for conciseness.

The ceramic board 60 includes the image sensor 41 for converting a light into an electric signal and the IR cut off filter 31.

Since the IR cut off filter 31 is disposed the ceramic board 60, an additional holder is not required for installing the IR cut off filter 31.

Accordingly, a design space of a camera module structure can be obtained. Due to the design space, durability, performance, and reliability of the camera module can be improved.

The ceramic board 60 is formed by coupling the first substrate 60a with the second substrate 60b, and the image sensor 41 may be inserted into the first concave portion 130 formed by coupling the first substrate 60a with the second substrate 60b.

The IR cut off filter 31 is disposed on the ceramic board 60 including the image sensor 41.

That is, since the IR cut off filter 31 is formed on the image sensor 41, the image sensor 41 is not polluted.

There is no cleansing method when impurity exists in a lens during manufacturing of the lens. However, since the IR cut off filter 31 is disposed on the ceramic board 60, the impurity can be removed by cleaning the lens after lens assembly. Then, the lens unit 20 can be coupled to the ceramic board 60. Consequently, a proportion of defective camera modules can be minimized.

Additionally, if the filter is polluted, the holder and the actuator must be destroyed together. However, since the IR cut off filter 31 is disposed on the ceramic board 60, if the IR cut off filter 31 is polluted, only the IR cut off filter 31 can be replaced. Therefore, its repair becomes simple.

Additionally, the first pad 51 is formed on the image sensor 41 and the second pad 52 is formed on the ceramic board 60. The first pad 51 and the second pad 52 are electrically connected to each other through a conductive material 59.

At this point, the conductive material 59 may be formed of a conductive tape or a solder including Au, Al, Pb, and Cu.

At this point, the IR cut off filter 31 is installed on the conductive material 59.

Although not illustrated in the drawings, an adhesive material may be disposed between the IR cut off filter 31 and the conductive material 59.

Additionally, an adhesive material is formed at the bottom of the first concave portion 130, such that the image sensor 41 and the ceramic board 60 are bonded.

The adhesive material may be formed of epoxy or a double-sided tape.

Figure 30:
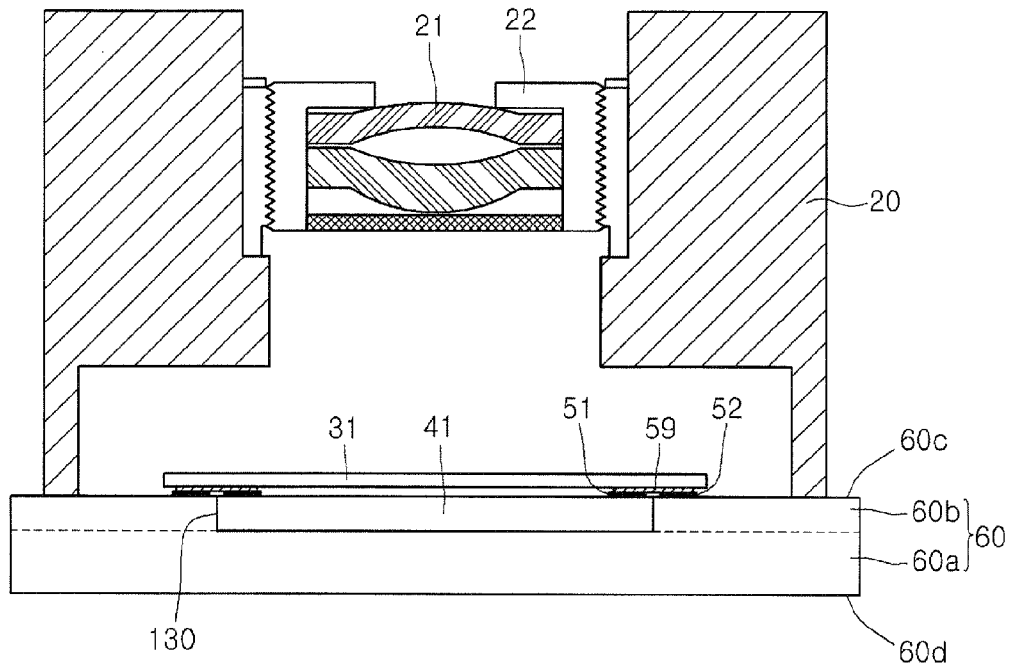

This embodiment illustrates a camera module having auto focus function where the actuator 23 is disposed but is not limited thereto. That is, as illustrated in FIG. 30, a camera module having a fixed focus function where no actuator 23 is disposed may be possible.

Figure 31:
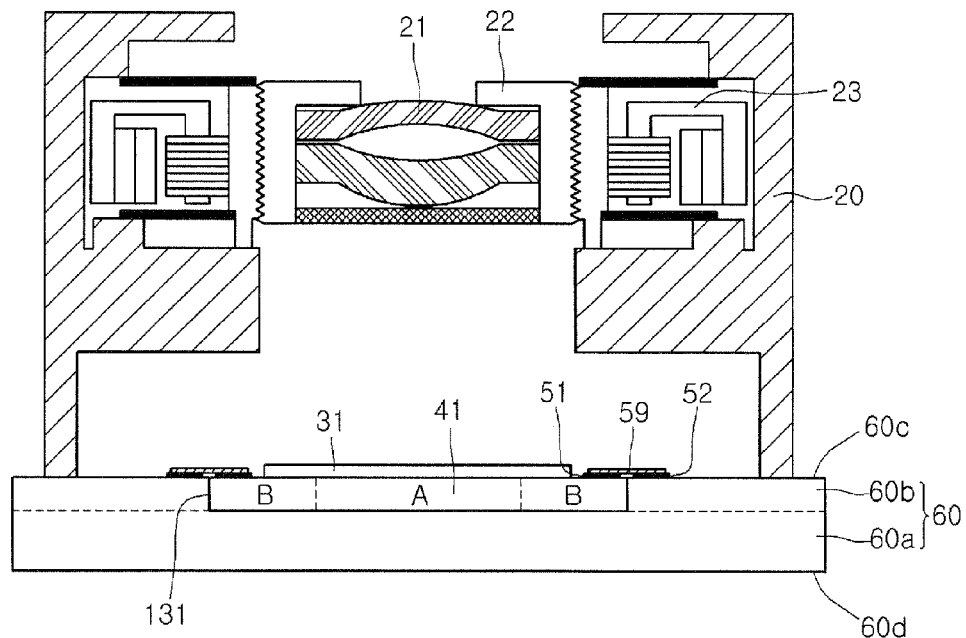

FIG. 31 is a side-sectional view of a camera module according to a twenty-first embodiment.

Throughout FIGS. 27 and 31, like reference numbers refer to like elements and their detailed description will be omitted for conciseness.

The ceramic board 60 includes the image sensor 41 for converting a light into an electric signal and the IR cut off filter 31.

Since the IR cut off filter 31 is formed on the ceramic board 60, an additional holder is not required for installing the IR cut off filter 31.

Accordingly, a design space of a camera module structure can be obtained. Due to the design space, durability, performance, and reliability of the camera module can be improved.

The ceramic board 60 is formed by coupling the first substrate 60a with the second substrate 60b, and the image sensor 41 may be inserted into the first concave portion 131 formed by coupling the first substrate 60a with the second substrate 60b.

The IR cut off filter 31 is formed on the image sensor 41.

At this point, the image sensor 41 includes a cell area A for detecting light and a peripheral area B where a peripheral circuit is disposed. The IR cut off filter 31 is greater than the cell area A of the image sensor 41 and is less than an entire size of the image sensor 41.

That is, the IR cut off filter 31 is disposed to sufficiently cover the cell area A of the image sensor 41.

Although not illustrated in the drawings, an adhesive material may be disposed between the IR cut off filter 31 and the peripheral area B of the image sensor 41, such that the IR cut off filter 31 and the image sensor 41 are coupled to each other.

That is, since the IR cut off filter 31 is disposed on the image sensor 41, the image sensor 41 is not polluted.

There is no cleansing method when impurity exists in a lens during manufacturing of the lens. However, since the IR cut off filter 31 is disposed on the ceramic board 60, the impurity can be removed by cleaning the lens after lens assembly. Then, the lens unit 20 can be coupled to the ceramic board 60. Consequently, a proportion of defective camera modules can be minimized.

Additionally, if the filter is polluted, the holder and the actuator must be destroyed together. However, since the IR cut off filter 31 is disposed on the ceramic board 60, if the IR cut off filter 31 is polluted, only the IR cut off filter 31 can be replaced. Therefore, its repair becomes simple.

Figure 32:
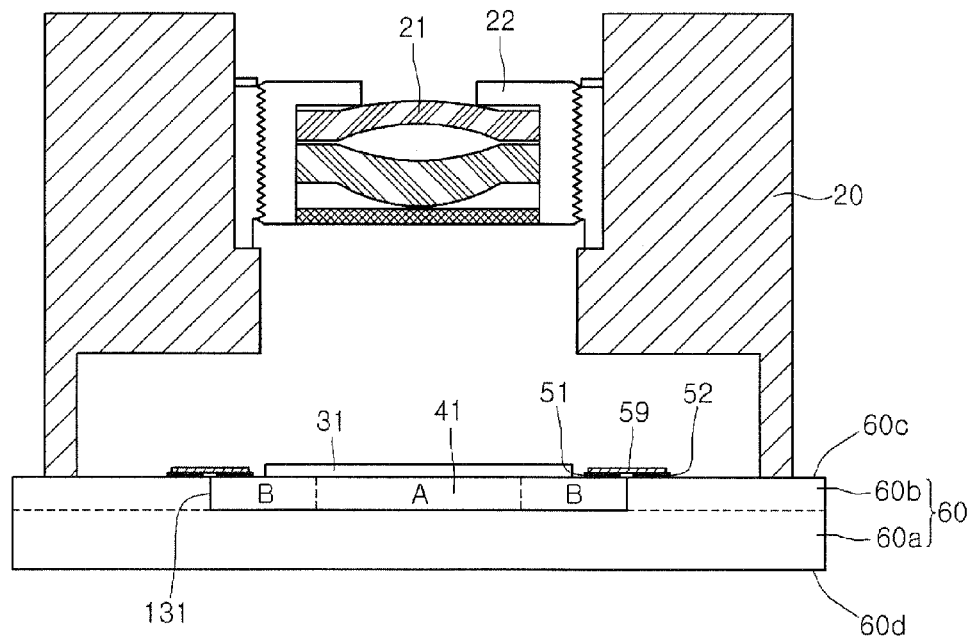
FIG. 32 shows a camera module having a fixed focus function where no actuator 23 is disposed.

This embodiment illustrates a camera module having auto focus function where the actuator 23 is disposed but is not limited thereto. That is, as illustrated in FIG. 32, a camera module having a fixed focus function where no actuator 23 is disposed may be possible.

Since the IR cut off filter 31 is disposed on the ceramic board 60 according to the camera modules of the abovementioned nineteenth to twenty-first embodiments, an additional holder is not required for installing the IR cut off filter.

Accordingly, a design space of a camera module structure can be obtained. Due to the design space, durability, performance, and reliability of the camera module can be improved.

Moreover, since the IR cut off filter is formed on the image sensor, pollution of the image sensor can be inhibited.

There is no cleansing method when impurity exists in a lens during manufacturing of the lens. However, since the IR cut off filter is disposed on the ceramic board, the impurity can be removed by cleaning the lens after lens assembly. Then, the lens unit can be coupled to the ceramic board. Consequently, a proportion of defective camera modules can be minimized.

Additionally, if the filter is polluted, the holder and the actuator must be destroyed together. However, since the IR cut off filter 31 is disposed on the ceramic board, if the IR cut off filter is polluted, only the IR cut off filter can be replaced. Therefore, its repair becomes simple.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
   a lens unit including a lens barrel;
   a holder coupled to the lens unit;
   an image sensor for converting a light through the lens unit into an electric signal; and
   a ceramic board coupled to the holder, the ceramic board having a concave portion where the image sensor is inserted,
   wherein the ceramic board includes a first substrate and a second substrate coupled to the first substrate, wherein the second substrate is closer to the holder than the first substrate is to the holder,
   wherein the second substrate includes a hole,
   wherein the concave portion is defined by the hole of the second substrate and a top surface of the first substrate,
   wherein the first substrate includes a first portion having a plurality of through holes under the image sensor and a second portion under the first substrate, wherein the first portion is in direct contact with image sensor, wherein the second portion is in direct contact with a second substrate, wherein the second substrate is in direct contact with the holder, and
   wherein an entire lower surface of the second substrate makes contact with the first substrate.

2. The camera module according to claim 1, wherein the ceramic board is coupled to the image sensor through an adhesive material disposed at a bottom of the concave portion.

3. The camera module according to claim 1, further comprising a first pad formed on the ceramic board and a second pad formed on the image sensor, the first pad and the second pad being electrically connected through a wire, a conductive tape or a solder.

4. The camera module according to claim 1, wherein a top surface of the ceramic board and a top surface of the image sensor are disposed on the same parallel plane.

5. The camera module according to claim 1, wherein the plurality of first holes extend from a top surface of the first substrate to a bottom surface of the first substrate.

6. The camera module according to claim 1, further comprising an adhesive material disposed on a sidewall of the concave portion in order to couple the ceramic board with the image sensor.

7. A camera module comprising:
a lens unit including a lens barrel;
a holder including an infrared ray (IR) cut off filter, the holder being coupled to the lens unit;
an image sensor for converting a light through the lens unit into an electric signal;
a ceramic board coupled to the holder, one surface of the ceramic board having concave portion with a side wall and a bottom surface and a second concave portion where the image sensor is inserted, wherein the second concave portion is spaced from the first concave portion; and
a peripheral device inserted into the first concave portion and coupled to the bottom surface of the first concave portion,
wherein the peripheral device is not overlapped with the image sensor its a vertical direction, and
wherein the ceramic board is disposed between the image sensor and the peripheral device in a horizontal direction.

8. The camera module according to claim 7, wherein the one surface of the ceramic board having the first concave portion is a surface where the holder is coupled in the ceramic board.

9. The camera module according to claim 7, further comprising a third pad formed on the image sensor and a fourth pad formed on the ceramic hoard, the third pad and the fourth pad being electrically connected through a wire bonding, a conductive tape, or a solder.

10. The camera module according to claim 7, wherein a top say face of the sensor and a top surface of the ceramic board are disposed on the same parallel plane.

11. The camera module according to claim 7, further comprising:
a molding material covering the peripheral device.

12. The camera module according to claim 11, wherein the molding material comprises an opaque insulation material.

13. A camera module comprising:
a lens unit including at least one lens;
a ceramic board coupled to the lens unit, wherein the lens unit is in direct contact with the ceramic board;
an image sensor on the ceramic board;
a spacer disposed between the image sensor and the lens unit; and
an IR cut off titter coupled to the spacer,
wherein the spacer is in direct contact with the ceramic board and spaced from the lens unit and the image sensor,
wherein a first pad is formed on the ceramic board, wherein a second pad electrically collected to the first pad is formed on the image sensor, wherein the first pad and the second pad are disposed inside the spacer, and
wherein the at least one lens is not overlapped with the spacer in a vertical direction.

14. The camera module according to claim 13, wherein the image sensor is inserted into the ceramic board.

* * * * *